United States Patent
Terao

(10) Patent No.: US 9,117,165 B2
(45) Date of Patent: Aug. 25, 2015

(54) IMAGE PROCESSING SYSTEM AND IMAGE PROCESSING APPARATUS FOR SENDING IMAGE DATA

(71) Applicant: CANON KABUSHIKI KAISHA, Tokyo (JP)

(72) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/786,211

(22) Filed: Mar. 5, 2013

(65) Prior Publication Data

US 2013/0235413 A1    Sep. 12, 2013

(30) Foreign Application Priority Data

Mar. 7, 2012    (JP) .................................. 2012-050692

(51) Int. Cl.
 *G06K 15/00* (2006.01)
 *G06F 21/60* (2013.01)

(52) U.S. Cl.
 CPC .......... *G06K 15/4095* (2013.01); *G06F 21/608* (2013.01)

(58) Field of Classification Search
 USPC ........ 358/1.14, 1.16, 1.15, 1.9, 1.6, 508, 501; 726/1, 3, 28, 7, 19, 16, 27, 31, 17, 21; 715/762, 764, 805, 804, 809, 810, 826, 715/831, 838, 841, 847, 849, 855, 733, 731
 See application file for complete search history.

(56) References Cited

U.S. PATENT DOCUMENTS

| 2006/0059570 A1 | 3/2006 | Kawabuchi et al. |
| 2007/0059570 A1* | 3/2007 | Miyata et al. .................... 429/24 |
| 2011/0271324 A1* | 11/2011 | Ikeda ................................. 726/3 |
| 2012/0327465 A1* | 12/2012 | Yamada ....................... 358/1.15 |

FOREIGN PATENT DOCUMENTS

| CN | 1744648 A | 3/2006 |
| CN | 102238170 A | 11/2011 |
| JP | 2006-101484 A | 4/2006 |

OTHER PUBLICATIONS

Omori, Image Transmission Apparatus Image Transmission Method Computer Program and Computer Readable Storage Medium, Apr. 13, 2006, Machine Translation Japanese Patent Application Publication, JP2006101484, All Pages.*

* cited by examiner

*Primary Examiner* — Ngon Nguyen
(74) *Attorney, Agent, or Firm* — Canon USA, Inc., IP Division

(57) ABSTRACT

An image processing system includes a reception unit configured to receive an input of authentication information from a user, an authentication unit configured to authenticate the user based on the authentication information received by the reception unit, a setting unit configured to set a destination of image data, an operation key configured to set a folder of the user as a destination of the image data, and a transmission unit configured to send the image data to a destination set by the setting unit. The image processing system performs control not to allow a destination setting using the operation key, in the case where a destination to be set by the setting unit is limited to a destination to be set using the operation key and a folder to be set in response to an operation of the operation key is the one to be registered by the user.

21 Claims, 25 Drawing Sheets

---

SYSTEM MANAGEMENT SETTINGS 1

■ FOLDER SETTING METHOD

- 601 HOME FOLDER
- 602 REGISTER FOR EACH USER
- 603 MANAGE IN SERVER

■ HOST NAME OF FOLDER server.abc.co.jp ─610

■ FOLDER PATH

/home ─620

FIG.8

USER SETTINGS (A1001)

■ PROTOCOL [ SMB ] ~801

■ HOST NAME OF FOLDER
[ server.abc.co.jp ] ~802

■ FOLDER PATH
[ /home/tanaka ] ~803

■ USER NAME
[ tanaka ] ~804

■ PASSWORD
[ secret55 ] ~805

FIG.9

| NEW REGISTRATION OF ADDRESS BOOK | |
|---|---|
| ■ PROTOCOL [ SMB ] ~901 | |
| ■ HOST NAME OF FOLDER | |
| [ server.abc.co.jp ] ~902 | |
| ■ FOLDER PATH | |
| [ /home/common ] ~903 | |
| ■ USER NAME | |
| [ common ] ~904 | |
| ■ PASSWORD | ■ ENTER PASSWORD FOR EACH TRANSMISSION |
| [ secret66 ] ~905 | [ ON ] |

| SETTING ERROR |
|---|
| FOLDER SETTING METHOD = "REGISTER FOR EACH USER", AND MY FOLDER RESTRICTION = "ON" CANNOT BE SET AT THE SAME TIME. |

FIG.19

```
USER SETTINGS (A1001)

■ PROTOCOL    SMB    ~801

■ HOST NAME OF FOLDER
  smb.server         ~802

■ FOLDER PATH
  /home/tanaka       ~803

■ USER NAME
  tanaka             ~804

■ PASSWORD
  secret55           ~805
```

FIG.23

| SETTING ERROR |
|---|
| WHEN FOLDER SETTING METHOD = "REGISTER FOR EACH USER" HAS BEEN SET, HOST NAME RESTRICTION = "OFF" AND MY FOLDER RESTRICTION = "ON" CANNOT BE SET AT THE SAME TIME. |

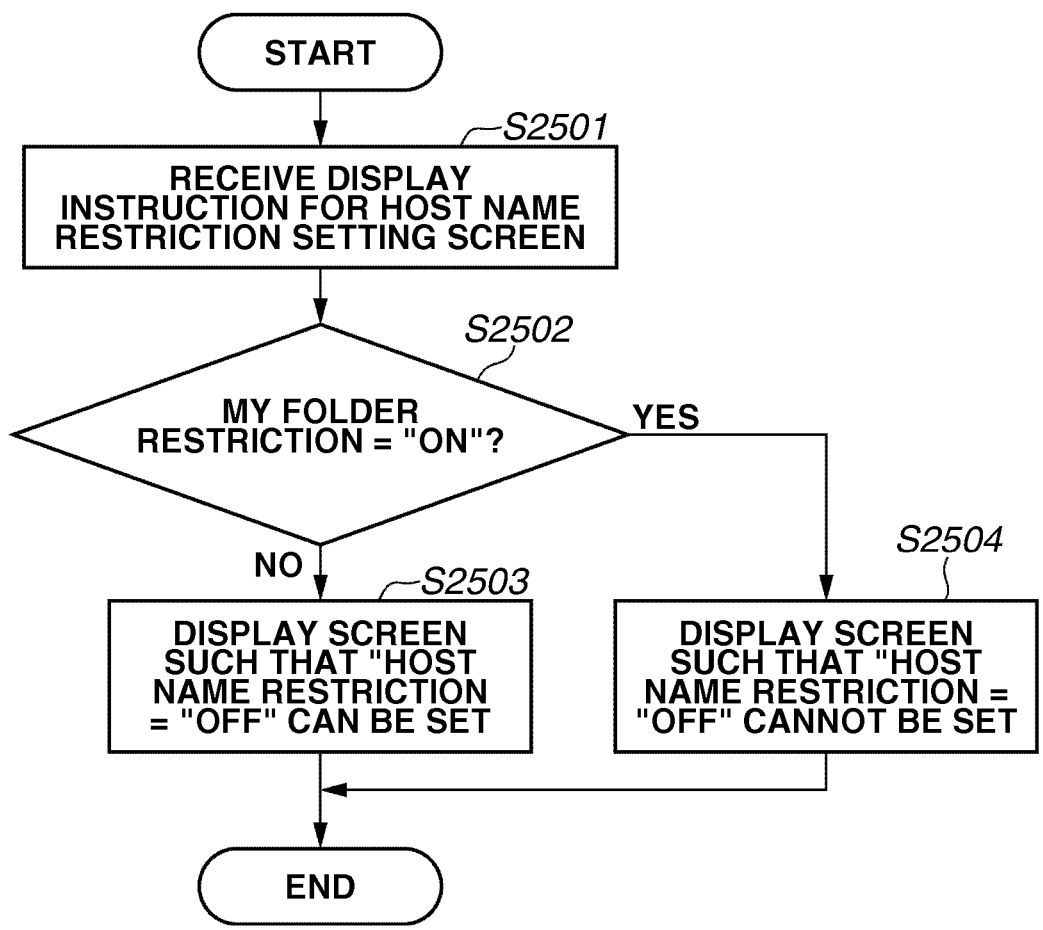

IMAGE PROCESSING SYSTEM AND IMAGE PROCESSING APPARATUS FOR SENDING IMAGE DATA

BACKGROUND OF THE INVENTION

1. Field of the Invention

The present invention relates to an image processing system and an image processing apparatus for sending image data.

2. Description of the Related Art

Image processing apparatuses provided with an operation key "send mail to myself" are conventionally known. For example, according to the technique discussed in Japanese Patent Application Laid-Open No. 2006-101484, when a user operates an operation key "send mail to myself", an e-mail address of the user operating the image processing apparatus is set as a destination of image data. Thus, the user can reduce the time and effort to input his/her e-mail address in sending the image data to his/her mail address.

In Japanese Patent Application Laid-Open No. 2006-101484, an operation key "send mail to myself" for setting an e-mail address is discussed. In addition to the "send mail to myself" key, an operation key "send file to myself" can be provided to image processing apparatuses. Sending a file means, for example, sending image data using a protocol such as Server Message Block (SMB) and File Transfer Protocol (FTP).

In the image processing apparatus including such a "send file to myself" operation key, in response to an operation of the "send file to myself" operation key, a folder of the user operating the image processing apparatus is set as the destination of image data. Accordingly, the user can reduce the time and effort to input folder information indicating the folder of the user's own in sending (storing) image data to the folder of the user's own. The folder to be set according to the operation of the "send file to myself" can be, for example, a folder set in advance by the user himself/herself.

Meanwhile, a function of limiting the folder that can be used as a destination for file transmission to a folder set in "send file to myself" is discussed (hereinafter, referred to as my folder restriction). The function aims to prevent a general user from mistakenly or intentionally sending image data to an improper folder and leaking confidential information. If an administrator sets the my folder restriction, a general user cannot set a destination for file transmission in methods other than "send file to myself".

In the case where a user sets in advance a folder to be set in "send file to myself" by himself/herself, however, even if the administrator sets the my folder restriction, the user can send data anywhere by changing the registered contents. This may cause confidential information leakage.

SUMMARY OF THE INVENTION

The present invention is directed to a mechanism, in an image processing system provided with an operation key for setting a user's folder as a destination of image data, capable of avoiding sending image data to an improper destination.

One aspect of the present invention provides, an image processing system including a reception unit configured to receive an input of authentication information from a user, an authentication unit configured to authenticate the user based on the authentication information received by the reception unit, a setting unit configured to set a destination of image data, an operation key configured to set a folder of the user as a destination of the image data, a transmission unit configured to send the image data to the destination set by the setting unit, and a control unit configured to, in the case where the destination to be set by the setting unit is limited to a destination to be set using the operation key and a folder to be set in response to an operation of the operation key is the one to be registered by the user, perform control not to allow a destination setting using the operation key.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an operation screen on the MFP according to the exemplary embodiment of the present invention.

FIG. 9 illustrates an operation screen on the MFP according to the exemplary embodiment of the present invention.

FIG. 15 illustrates an operation screen on the MFP according to the exemplary embodiment of the present invention.

FIG. 19 illustrates an operation screen on the MFP according to the exemplary embodiment of the present invention.

FIG. 23 illustrates an operation screen on the MFP according to the exemplary embodiment of the present invention.

FIG. 25 is a flowchart illustrating an operation performed if an instruction to display a setting screen for setting the host name restriction is issued in the MFP according to the exemplary embodiment of the present invention.

DESCRIPTION OF THE EMBODIMENTS

Various exemplary embodiments, features, and aspects of the invention will be described in detail below with reference to the drawings.

All of combinations of the features described in the exemplary embodiments are not always essential to the means for solution according to the invention.

Figure 1:
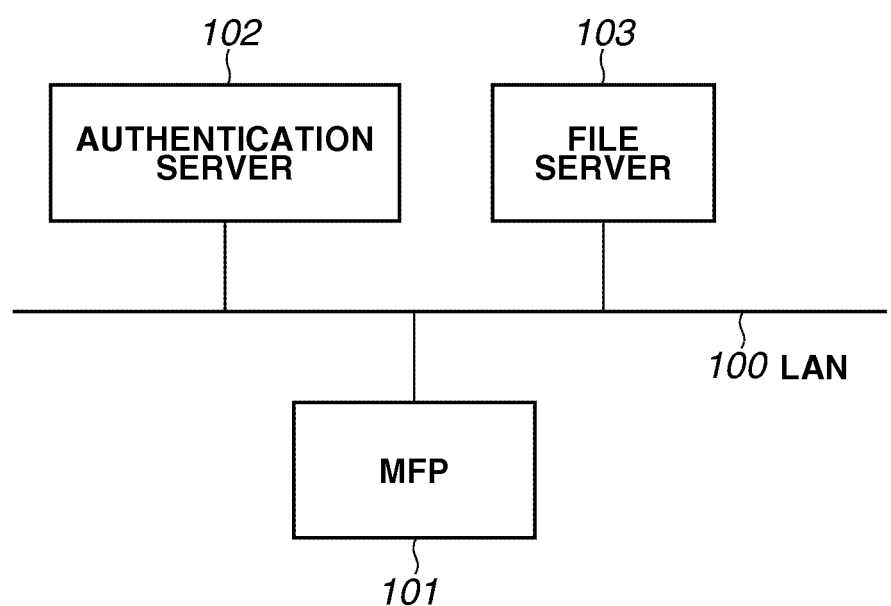
FIG. 1 illustrates an overview of an image processing system according to an exemplary embodiment of the present invention.

A first exemplary embodiment of the present invention is described. FIG. 1 illustrates an overview of an image processing system. On a local area network (LAN) 100, an MFP 101, an authentication server 102, and a file server 103 are connected to each other in a communicable manner. The MFP 101 is an example of an image processing apparatus. The authentication server 102 is an example of an authentication apparatus. The file server 103 is an example of a file management apparatus.

The MFP 101 can send a file of image data to a folder in the file server 103 as the destination with SMB or FTP. In addition to the file server 103, the MFP 101 can set a folder in a client personal computer (PC) (not illustrated) as the destination. The MFP 101 can also send image data by e-mail via a mail server (not illustrated).

The image processing system includes the MFP 101, the authentication server 102, and the file server 103. Alternatively, the image processing system may include only the MFP 101 and the authentication server 102, or only the MFP 101.

Figure 2:
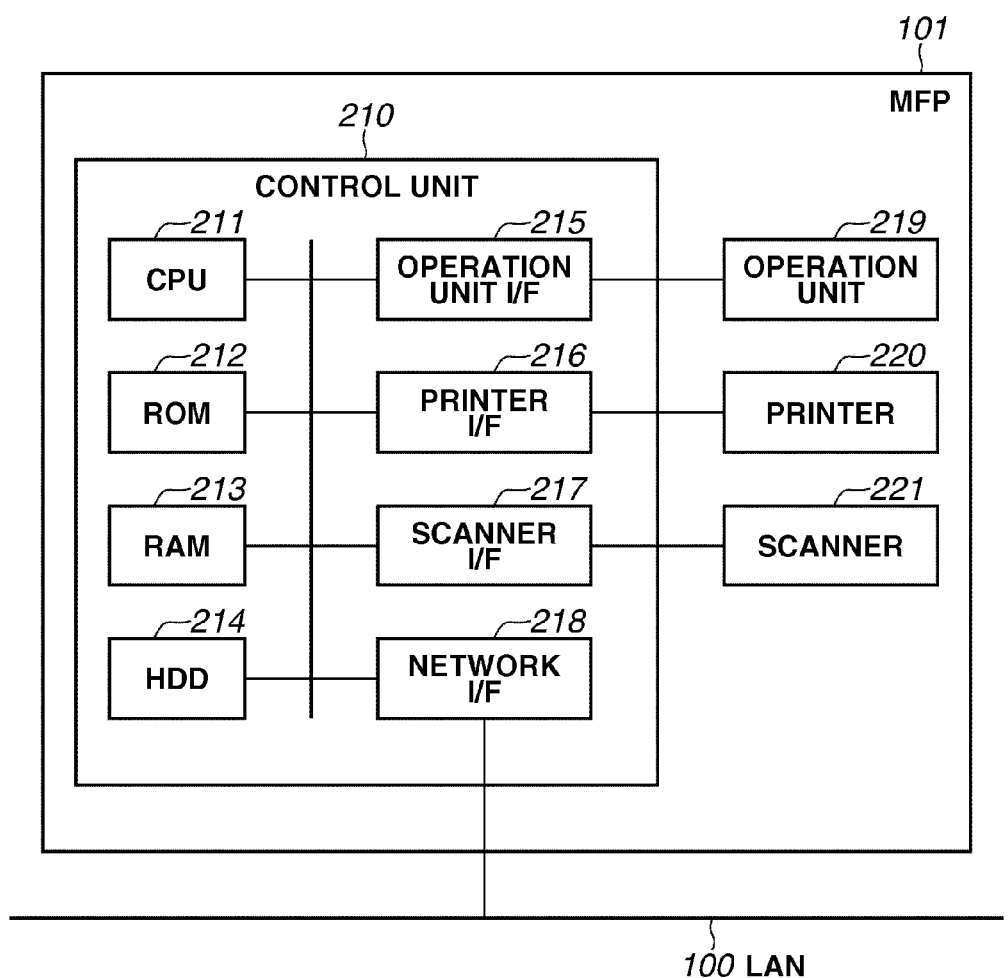
FIG. 2 is a block diagram illustrating a configuration of a multifunction peripheral (MFP) according to the exemplary embodiment of the present invention.

FIG. 2 is a block diagram illustrating a configuration of the MFP 101. A control unit 210 including a central processing unit (CPU) 211 entirely controls operations in the MFP 101. The CPU 211 reads a control program stored in a read-only memory (ROM) 212, and executes various types of control processes such as read control and transmission control. A random access memory (RAM) 213 serves as a temporary storage area such as a main memory and a work area of the CPU 211.

According to the present exemplary embodiment, in the MFP 101, one CPU 211 executes each process illustrated in flowcharts in FIGS. 10 to 14, FIG. 16, FIG. 17, FIGS. 20 to 22, FIG. 24, and FIG. 25 described below using one memory (the RAM 213 or a hard disk drive (HDD) 214). However, other configurations can be employed. For example, a plurality of CPUs and a plurality of RAMs or HDDs can cooperate with each other to perform each process illustrated in the flowcharts in FIGS. 10 to 14, FIG. 16, FIG. 17, FIGS. 20 to 22, FIG. 24, and FIG. 25.

A HDD 214 stores image data and various programs. An operation unit Interface (I/F) 215 connects an operation unit 219 and the control unit 210. The operation unit 219 includes a liquid crystal display unit having a touch panel function, a keyboard, and the like, and serves as a reception unit for receiving instructions from a user.

A printer I/F 216 connects a printer 220 and the control unit 210. Image data to be printed by the printer 220 is transferred from the control unit 210 via the printer I/F 216, and printed on a recording medium by the printer 220.

A scanner I/F 217 connects a scanner 221 and the control unit 210. The scanner 221 reads an image on an original document, generates image data (an image file), and inputs the image data to the control unit 210 via the scanner I/F 217. The MFP 101 can send the image data (image file) generated by the scanner 221 as a file or a file attached to an e-mail.

A network I/F 218 connects the control unit 210 (the MFP 101) to a LAN 100. The network I/F 218 sends image data and information to an external device (for example, the authentication server 102 and the file server 103) on the LAN 100, and receives various types of information from an external device on the LAN.

Figure 3:
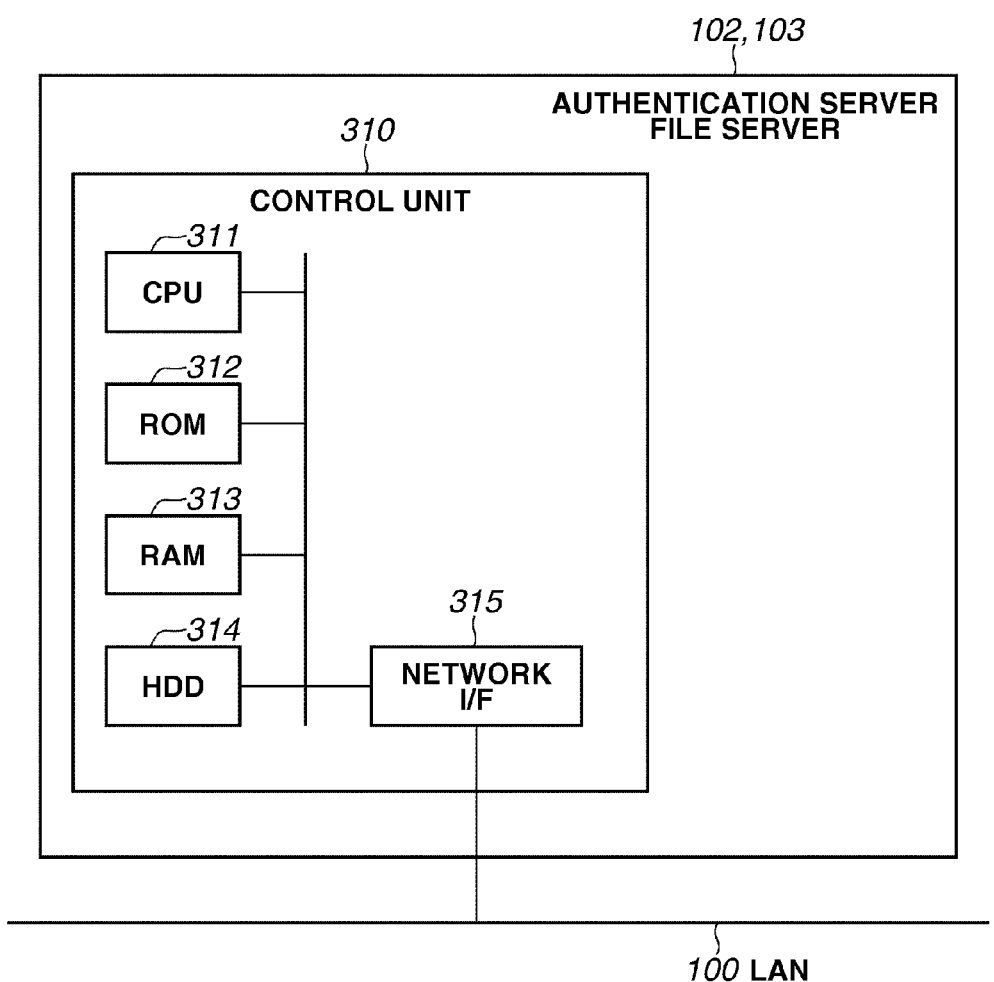
FIG. 3 is a block diagram illustrating a configuration of an authentication server and a file server according to the exemplary embodiment of the present invention.

FIG. 3 is a block diagram illustrating a configuration of the authentication server 102. A control unit 301 including a CPU 311 entirely controls operations in the authentication server 102. The CPU 311 reads a control program stored in a ROM 312, and executes various types of control processing. A RAM 313 serves as a temporary storage area such as a main memory and a work area of the CPU 311. A HDD 314 stores image data and various programs.

A network I/F 315 connects the control unit 310 (the authentication server 102) to the LAN 100. The network I/F 315 sends and receives various types of information to and from another device on the LAN 100. The configuration of the file server 103 is similar to that of the authentication server 102 (FIG. 3), and consequently, its description is omitted.

Figure 4:
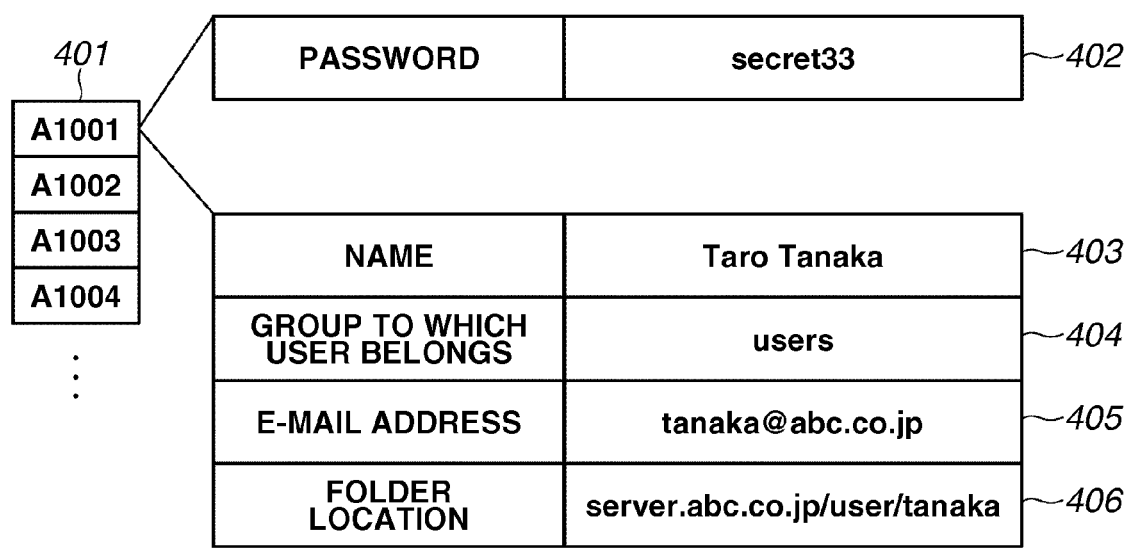
FIG. 4 illustrates information managed by the authentication server according to the exemplary embodiment of the present invention.

FIG. 4 illustrates information managed in the HDD 314 by the authentication server 102. The authentication server 102 manages a domain including the image processing system illustrated in FIG. 1. The authentication server 102 further manages information pieces 401 and 402 necessary for authentication of a user and information pieces 403 to 408 about the user, for each user. The information 401 is a user name that uniquely identifies a user. For example, the information 401 is an employee code in a company in which the MFP 101 is installed.

FIG. 4 illustrates information of a user corresponding to a user name of A1001. When the user of A1001 starts to use the MFP 101, the user needs to input "A1001" as the user name, and "secret33" as the password. The authentication information (the user name and the password) input to the MFP 101 is sent to the authentication server 102.

The authentication server 102 compares the authentication information (the user name and the password) sent from the MFP 101 to the authentication information managed as the information pieces 401 and 402. If the information pieces correspond to each other, the authentication server 102 notifies the MFP 101 of authentication OK (successful in authentication). If the authentication information pieces do not correspond to each other, the authentication server 102 notifies the MFP 101 of authentication NG (failure in authentication).

The information pieces 403 to 408 are notified to the MFP 101 together with authentication OK if the authentication information pieces correspond to each other. The information 403 indicates that the name of the user A1001 is "Taro Tanaka". The information 404 indicates that the user A1001 belongs to a group "users". The information 405 indicates an e-mail address of the user A1001. The user A1001 can receive an electronic mail sent to the e-mail address that is managed as the information 407 as the destination. The information 406 indicates a location in which a folder of the user A1001 is placed. The user A1001 can access the folder indicated by the information 406, and obtain data stored in the folder.

Figure 5:
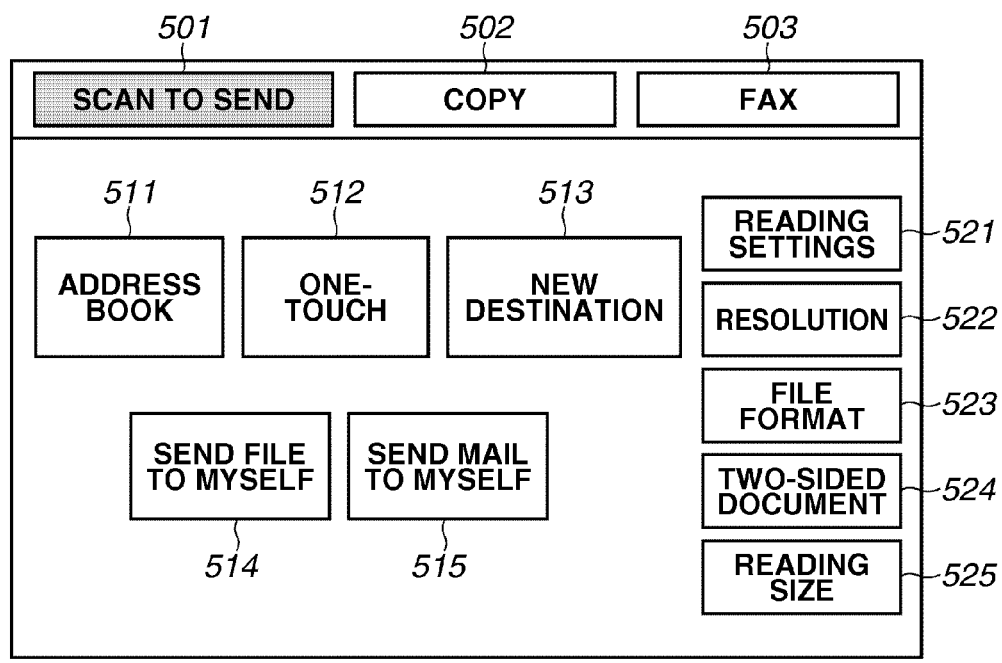
FIG. 5 illustrates an operation screen on the MFP according to the exemplary embodiment of the present invention.

FIG. 5 illustrates an example of an operation screen displayed on the operation unit 219. On the screen illustrated in FIG. 5, a user can operate any of operation keys 501 to 503 to select a function. FIG. 5 illustrates a state the operation key 501 is being selected. FIG. 5 is an example in which "scan and send", "copy", and "fax" are displayed as the functions. However, the MFP 101 may include functions other than these functions.

After selecting the operation key 501, the user further operates any of the operation keys 511 to 515 to set a destination of image data to be sent. If the user operates the operation key 511, the content in the address book stored in the HDD 214 is displayed. Then, the user can refer to the content registered in the address book, and set the content as the destination of the image data.

If the user operates the operation key 512, a list of one-touch keys is displayed. With the one-touch key, one or a plurality of destinations are associated in advance. If the user operates the one-touch key, the content associated with the one-touch key can be set as the destination of the image data.

If the user operates the operation key 513, a screen for receiving an input of destination information from the user is displayed. The user can input the destination information via the displayed screen, and set the information as the destination of the image data.

The operation key 514 is used when the user wants to set a folder of the user as the destination of the image data. If the user operates the operation key 514, the folder of the user's own is automatically set as the destination of the image data. (This operation is described below in detail.)

The operation key 515 is used when the user wants to set an e-mail address of the user' own as the destination of the image data. If the user operates the operation key 515, the e-mail address of the user's own is automatically set as the destination of the image data.

The operation key 521 is used to perform read setting such as a color/monochrome setting. The operation key 522 is used to set a reading resolution.

The operation key 523 is used to set a file format of the image data to be sent. The operation key 524 is used to perform setting of a one-sided/two-sided reading. The operation key 525 is used to set a reading size.

Figure 6:
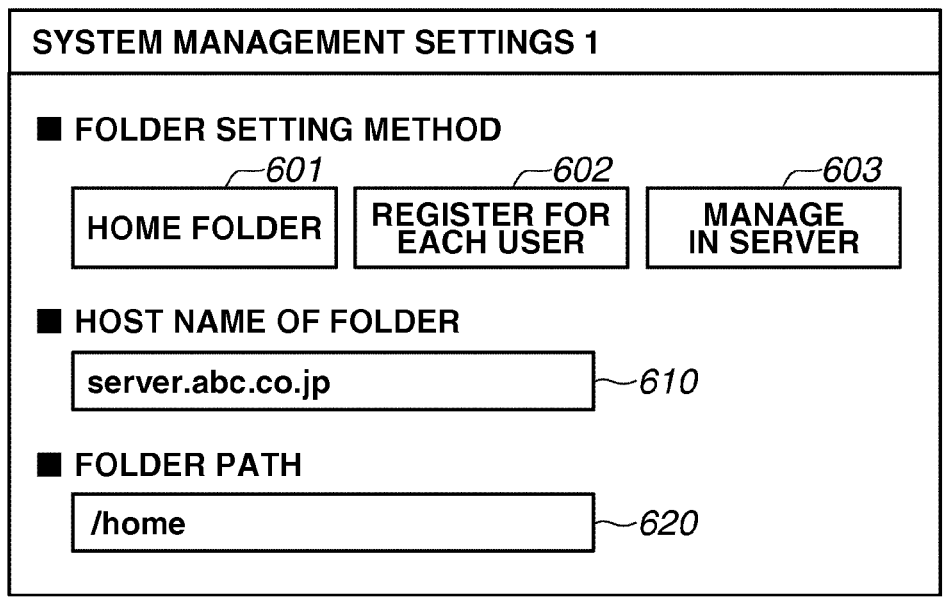
FIG. 6 illustrates an operation screen on the MFP according to the exemplary embodiment of the present invention.

FIG. 6 illustrates an example of operation screens displayed on the operation unit 219. Only the administrator can operate the screen in FIG. 6. In the case that a general user operates the MFP 101, the screen in FIG. 6 is not displayed. The administrator operates any of operation keys 601 to 603 to select a folder setting method in a case where the operation key 514 is operated.

The MFP 101 includes three folder setting methods, namely "home folder", "register for each user", and "manage in server". In the setting method "home folder", the administrator registers, in the MFP 101 in advance, a host name and a part of a path of a folder to be commonly used by each user, and these information pieces are set as the destination of image data.

The administrator registers a host name and a part of a path of a folder to be used when "home folder" is selected as information pieces 610 and 620 in FIG. 6. In this setting method, for example, folders of individual users can be provided in the same host and/or in the same folder. Consequently, the administrator can easily manage the folders.

In the setting method "register for each user", a general user registers a host name and a path of a folder of the user's own in the MFP 101 by associating with each user in advance, and these information pieces are set as the destination of image data. The registration process is described below in detail with reference to FIG. 8. In this setting method, each user can register an arbitrary folder as his/her own folder. Consequently, this method makes it easy for the user to use the MFP 101.

In the setting method "manage in server", information managed as the information 408 in FIG. 4 in the authentication server 102 is set as the destination of the image data. In this setting method, folders of each of the users are managed in a unified manner by the server. Consequently, when the folder information needs to be updated, the time and effort for update can be reduced.

Since the MFP 101 includes the three folder setting methods, i.e., "home folder", "register for each user" and "manage in server", the MFP 101 can selectively switch the folder setting methods according to the environment that the MFP 101 is installed. In the case that the operation key 602 or 603 is operated, the fields of the information pieces 610 and 620 may be grayed out so as not to receive an input thereto.

Figure 7:
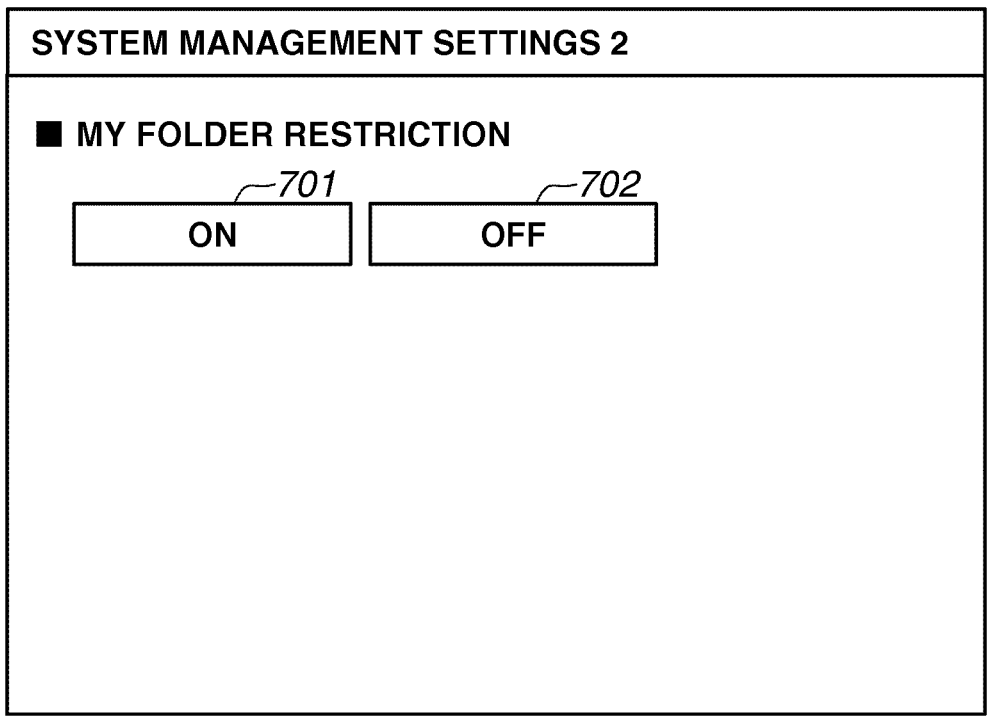
FIG. 7 illustrates an operation screen on the MFP according to the exemplary embodiment of the present invention.

FIG. 7 illustrates an example of an operation screen displayed on the operation unit 219. Only the administrator can operate the screen in FIG. 7. When a general user operates the MFP 101, the screen in FIG. 7 is not displayed. The administrator can perform the my folder restriction setting via the screen in FIG. 7.

If the administrator operates an operation key 701, the my folder restriction is set to "ON". If the my folder restriction is set to "ON", with respect to the file transmission, file transmission to destinations other than the destination set with use of the operation key 514 is forbidden. In response to the setting of the my folder restriction "ON", destination restriction on protocols other than the protocol for file transmission (for example, the protocol for electronic mail), can also be set.

In a case where the my folder restriction is set to "ON", when the operation key 511 in FIG. 5 is operated, in the destinations registered in the address book, only destinations corresponding to protocols other than the protocol for the file transmission are displayed. Similarly, when the operation key 512 is operated, in the registered one-touch keys, only one-touch keys corresponding to protocols other than the protocol for the file transmission are displayed.

Similarly, when the operation key 513 is operated, a destination corresponding to a protocol other than the protocol for the file transmission is only allowed to be input. If the content is the same as the content of the destination set using the operation key 514, however, the destination can be selected or specified using one of the operation keys 511 to 513 in the state that the my folder restriction is set to "ON". If the administrator operates an operation key 702, the my folder restriction is not set.

FIG. 8 illustrates an example of operation screens displayed on the operation unit 219. The screen in FIG. 8 is displayed when a general user operates the MFP 101. Via the screen in FIG. 8, the user registers folder information of the user (in the example in FIG. 8, the user A1001).

The information 801 indicates a protocol selected by the user. In the MFP 101, any of SMB and FTP can be selected. However, protocols other than SMB and FTP may be included in options.

The information pieces 802 and 803 indicate location information (a host name and a path) of a folder to be the destination of image data. The information pieces 804 and 805 indicate authentication information (a user name and a password) necessary for access to the folder specified by the information pieces 802 and 803.

FIG. 9 illustrates an example of an operation screen displayed on the operation unit 219. The screen in FIG. 9 is displayed when a general user operates the MFP 101. Via the screen in FIG. 9, the user can register a destination to the address book. In this example, a registration of a destination to which image data is sent with SMB that is an example of the file transmission is described.

The information 901 indicates a protocol selected by the user. In the MFP 101, any of SMB and FTP can be selected. However, protocols other than SMB and FTP may be included in options.

The information pieces 902 and 903 indicate location information (a host name and a path) of a folder to be the destination of image data. The information pieces 904 and 905 indicate authentication information (a user name and a password) necessary for access to the folder specified by the information pieces 902 and 903.

The information 906 indicates whether to cause a user to input the password of the information 905 for each transmission. If the information 906 is set to "ON", when image data is actually sent, the user needs to input the password again even if the password is registered as the information 905.

Figure 10:
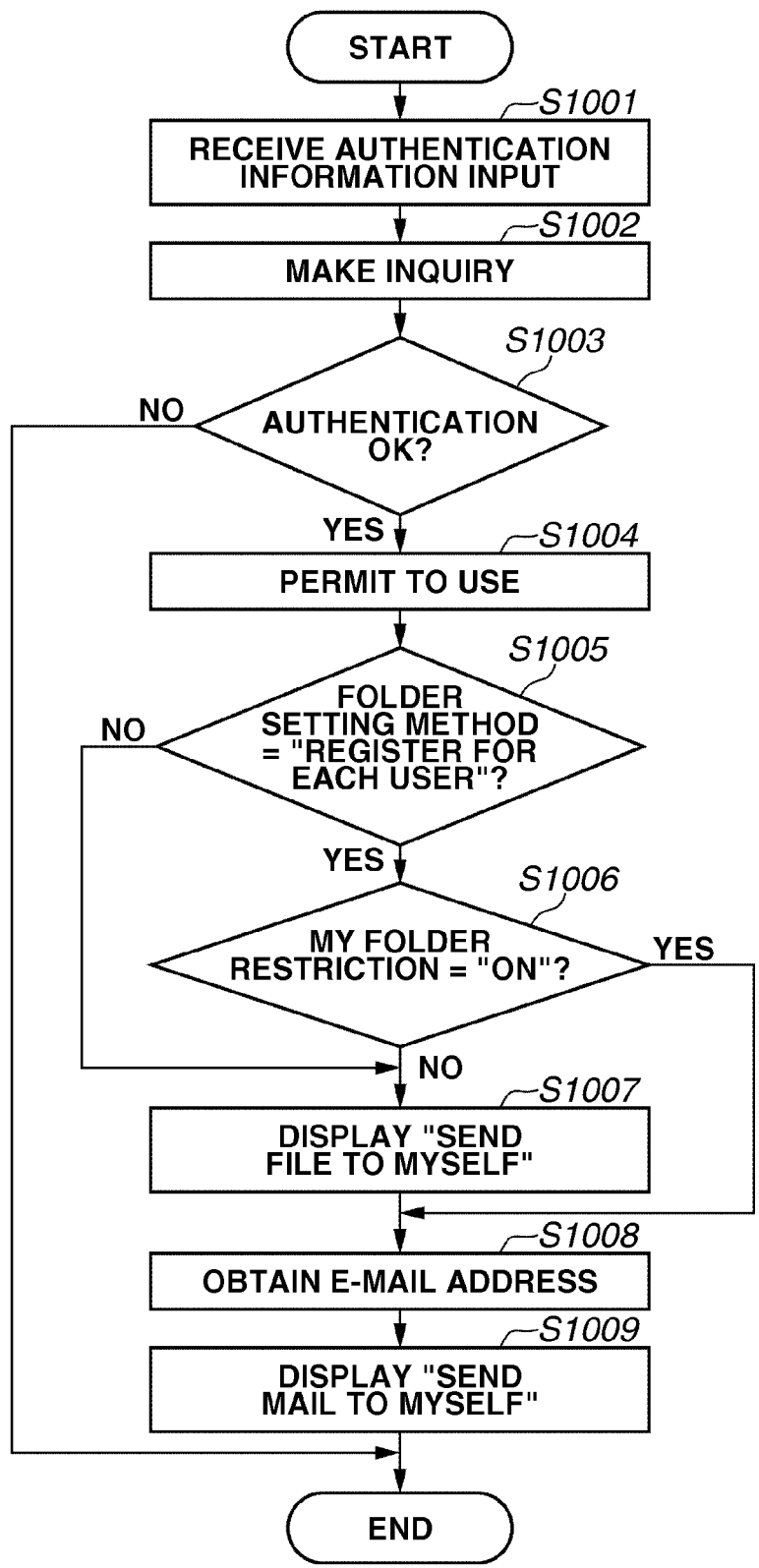
FIG. 10 is a flowchart illustrating a login operation in the MFP according to the exemplary embodiment of the present invention.

FIG. 10 is a flowchart illustrating a login operation (a series of operations performed when the user starts to use the MFP 101) performed in the MFP 101. Each operation (step) illustrated in the flowchart in FIG. 10 is realized by the CPU 211 in the MFP 101 by executing a control program stored in the HDD 214.

In step S1001, the CPU 211 receives an input of authentication information (a user name and a password) from a user via the screen displayed on the operation unit 219 (reception).

In step S1002, the CPU 211 sends the authentication information received in step S1001 to the authentication server 102, and asks the user to perform the user authentication (makes an inquiry about whether the user is permitted to use the MFP 101).

In step S1003, the CPU 211 determines whether to authenticate the content notified from the authentication server 102. If the authentication of the content is successful (YES in step S1003), the processing proceeds to step S1004. In step S1004, the CPU 211 permits the user to use the MFP 101. On the other hand, the authentication of the content is failed (NO in step S1003), the processing ends. (Or the processing returns to step S1001, and the screen for inputting the authentication information is displayed again.)

In step S1005, the CPU 211 determines whether the folder setting method set in advance on the screen in FIG. 6 is "register for each user". If the folder setting method is "register for each user" (YES in step S1005), the processing proceeds to step S1006. Whereas if not (NO in step S1005), the processing proceeds to step S1007. In step S1007, the CPU 211 displays the operation key 514 on the screen in FIG. 5.

In step S1006, the CPU 211 determines whether the my folder restriction set in advance on the screen in FIG. 7 is "ON". If the my folder restriction is "ON" (YES in step S1006), the processing proceeds to step S1008. If the my folder restriction is not "ON" (NO in step S1006), the processing proceeds to step S1007. In other words, if the folder setting method is "register for each user" and the my folder restriction is "ON", the CPU 211 skips the processing in step S1007, so that the operation key 514 is not displayed on the screen in FIG. 5.

As a result, if the folder setting method is "register for each user" and the my folder restriction is "ON", the file transmission cannot be performed. Accordingly, the user can be prevented from sending image data as a file to an improper destination against the intention of the administrator who has set the my folder restriction to "ON".

In step S1008, the CPU 211 obtains an e-mail address which is registered to the authentication server 102 as the information 405 in FIG. 4 and notified together with the information of the successful in the authentication. In step S1009, the CPU 211 displays the operation key 515 on the screen in FIG. 5.

Figure 11:
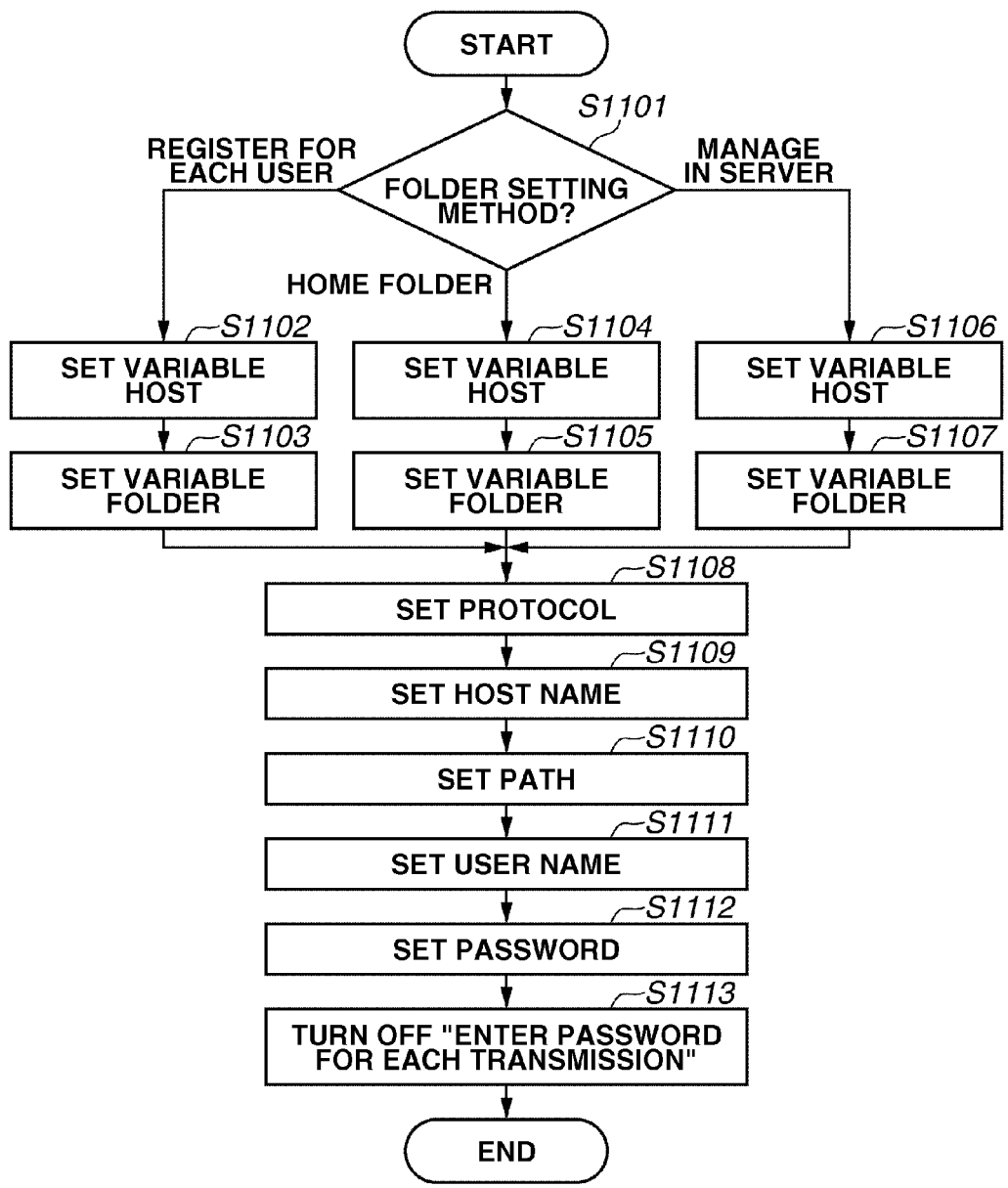
FIG. 11 is a flowchart illustrating an operation performed if "send file to myself" is selected in the MFP according to the exemplary embodiment of the present invention.

FIG. 11 is a flowchart illustrating a series of operations to be performed when the operation key 514 in FIG. 5 is operated in the MFP 101. Each operation (step) illustrated in the flowchart in FIG. 11 is realized by the CPU 211 in the MFP 101 by executing a control program stored in the HDD 214.

In step S1101, the CPU 211 determines which folder setting method is selected. If the selected folder setting method is "register for each user", the processing proceeds to step S1102. If the selected folder setting method is "home folder", the processing proceeds to step S1104. If the selected folder setting method is "manage in server", the processing proceeds to step S1106.

In step S1102, the information 802 in FIG. 8 is set as a value of a variable HOST. In step S1103, the information 803 in FIG. 8 is set as a value of a variable FOLDER.

In step S1104, the information 610 in FIG. 6 is set as a value of the variable HOST. In step S1105, a value obtained by combining the information 620 in FIG. 6 and the user name input by the user via the screen displayed in step S1001 in FIG. 10 is set as a value of the variable FOLDER. In the case of the examples illustrated in FIGS. 4 and 6, the value set in step S1105 is "/home/A10012".

In step S1106, a part of the information 406 in FIG. 4 is set as a value of the variable HOST. In step S1107, a remaining part of the information 408 in FIG. 4 is set as a value of the variable FOLDER. In the case of the example illustrated in FIG. 4, the value set in step S1106 is "server.abc.co.jp", and the value set in step S1107 is "/user/tanaka".

In step S1108, the CPU 211 set a protocol to be used for the file transmission of the image data. For the protocol to be used for file transmission, in a case where the destination in the address book is referred, the protocol selected in the information 901 in FIG. 9 is employed, and in a case where the destination is set by operating the operation key 514, SMB is automatically set.

The SMB is automatically set because in the protocols to be used for the file transmission, SMB is most frequently used. Alternatively, another protocol, for example, FTP may be automatically set. If the folder setting method is "register for each user", the protocol set as the information 801 may be preferentially set In step S1109, the value of the variable HOST set in steps S1102, S1104, or S1106 is set as a host name for specifying a folder to be the destination of the image data.

In step S1110, the value of the variable FOLDER set in steps S1103, S1105, or S1107 is set as a path for specifying the folder to be the destination of the image data.

In step S1111, the information of the user name input by the user via the screen displayed in step S1001 in FIG. 10 is set as a user name for accessing the folder to be the destination of the image data.

In step S1112, the information of the password input by the user via the screen displayed in step S1001 in FIG. 10 is set as a password for accessing the folder to be the destination of the image data.

As described above, the authentication information input by the user via the screen displayed in step S1001 in FIG. 10 is taken over (diverted) as the authentication information for accessing the folder to be the destination of the image data. According to the processing illustrated in FIG. 10, the authentication information for accessing the folder to be the destination of the image data is not necessary to be registered in the MFP 101 in advance, and the time and effort in the destination setting for file transmission can be reduced.

In step S1113, the CPU 211 sets the information indicating whether the user inputs the password for each transmission (the information described as the information 906 in FIG. 9) to "OFF".

Figure 12:
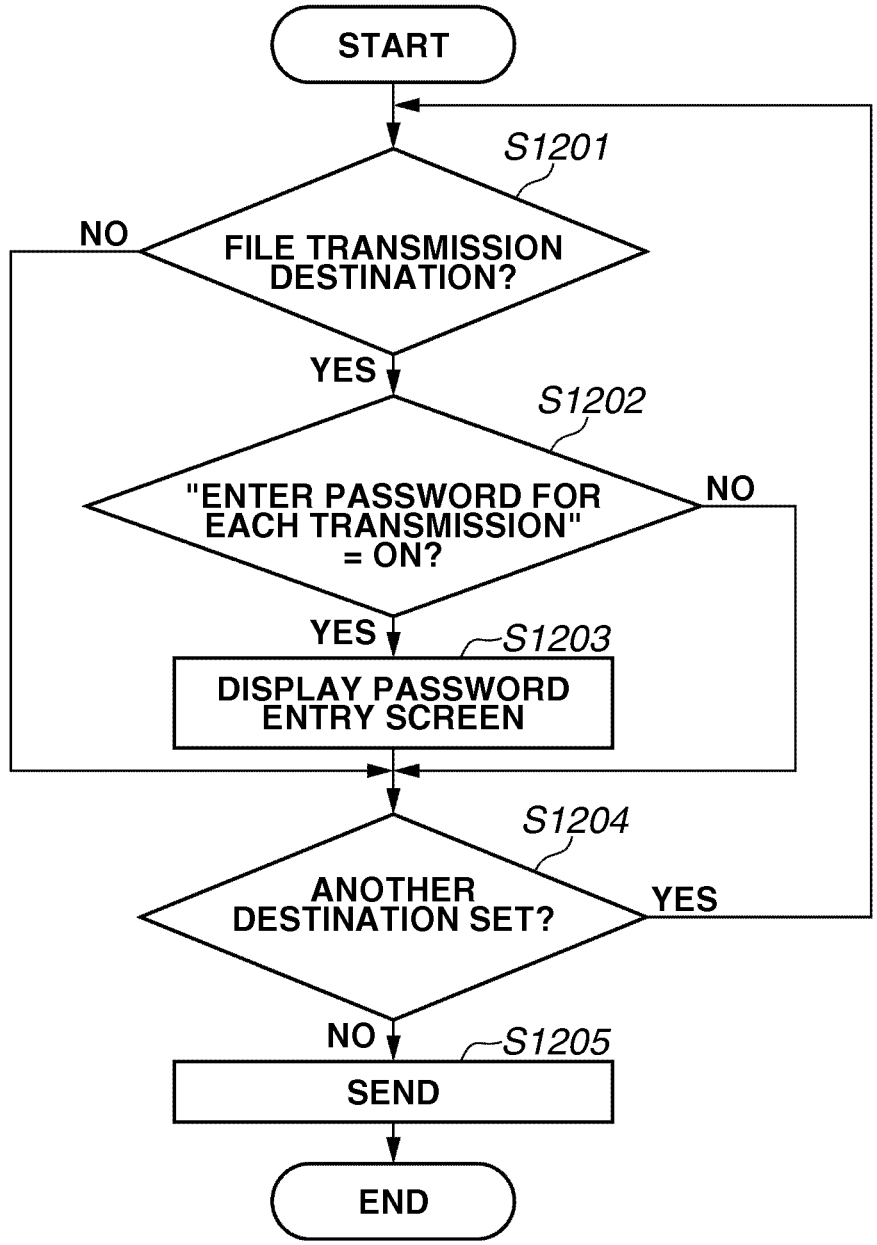
FIG. 12 is a flowchart illustrating an operation performed if a start key is operated in the MFP according to the exemplary embodiment of the present invention.

FIG. 12 is a flowchart illustrating a series of operations to be performed when a start key (not illustrated) is operated in the MFP 101 after the destination setting via the screen in FIG. 5 is performed. Each operation (step) illustrated in the flowchart in FIG. 12 is realized by the CPU 211 in the MFP 101 by executing a control program stored in the HDD 214.

In step S1201, the CPU 211 selects the set destination (if a plurality of destinations is set, one of the destinations), and determines whether the selected destination is the destination to which the image data is sent as a file. If the CPU 211 determines that the selected destination is the destination to which the image data is sent as a file (YES in step S1201), the processing proceeds to step S1202. Whereas, if not (NO in step S1201), the processing proceeds to step S1204. In this case, the destination which is not determined as the destination to which the image data is sent as a file is a destination to which the image data is to be sent as an attachment of an electronic mail. However, the destination which is not determined as the destination to which the image data is sent as a file may be a destination to which the image data is sent with a protocol other than the electronic mail.

In step S1202, the CPU 211 determines whether the information which is set to the selected destination and indicates that the user inputs the password for each transmission (the information described as the information 906 in FIG. 9) is "ON". As a result of the determination, if the setting that the user inputs the password for each transmission is ON (YES in step S1202), the processing proceeds to step S1203. If not (NO in step S1202), the processing in step S1203 is skipped, and the processing proceeds to step S1204. With respect to the destination set with the operation key 514 in FIG. 5, the information indicating whether the user inputs the password for each transmission is set to OFF as described in step S1113 in FIG. 11, so that the determination result in step S1202 is to be NO.

In step S1203, the CPU 211 displays a screen for receiving an input of the password from the user, and receives an input of the password from the user.

In step S1204, the CPU 211 determines whether another destination is set. If another destination is set (YES in step S1204), the processing proceeds to step S1201. If another destination is not set (NO in step S1204), the processing proceeds to step S1205.

In step S1205, the image data is sent by the protocol corresponding to the set destination. If the destination is set with the operation key 514 in FIG. 5, the CPU 211 connects to the file server 103 corresponding to the host name set in step S1109 in FIG. 11 by SMB.

Using the path set in step S1110, the CPU 211 specifies the folder to which the image data is stored. Further, the CPU 211 logs in the file server 103 (access the folder) with the authentication information pieces set in steps S1111 and S1112 in FIG. 11, and sends the image data to the file server 103 (stores the image data in the folder).

If the destination is set with reference to the address book and is in compliant with the format for the file transmission, the CPU 211 connects to the file server 103 corresponding to the information 902 in FIG. 9, and specifies the folder to which the image data is stored with the information 903 in FIG. 9.

Further, the CPU 211 logs in to the file server 103 (accesses the folder) with the information pieces 904 and 905 in FIG. 9 (or the password input in step S1203 in FIG. 12), and sends the image data to the file server 103 (stores the image data in the folder). If the destination is set with the operation key 515 in FIG. 5, the CPU 211 logs in (SMTP authentication) to the mail server, and sends the electronic mail with the image data attached.

As described above, according to the first exemplary embodiment, if the folder setting method is "register for each user" and the my folder restriction is set to "ON", the operation key 514 is not displayed. Accordingly, the user can be prevented from sending image data as a file to an improper destination against the intention of the administrator who has set the my folder restriction to "ON".

A second exemplary embodiment of the present invention is described. According to the second exemplary embodiment, if the folder setting method is "register for each user", setting the my folder restriction to "ON" is restricted. Descriptions of configurations similar to those in the above-described first exemplary embodiment are omitted.

Figure 13:
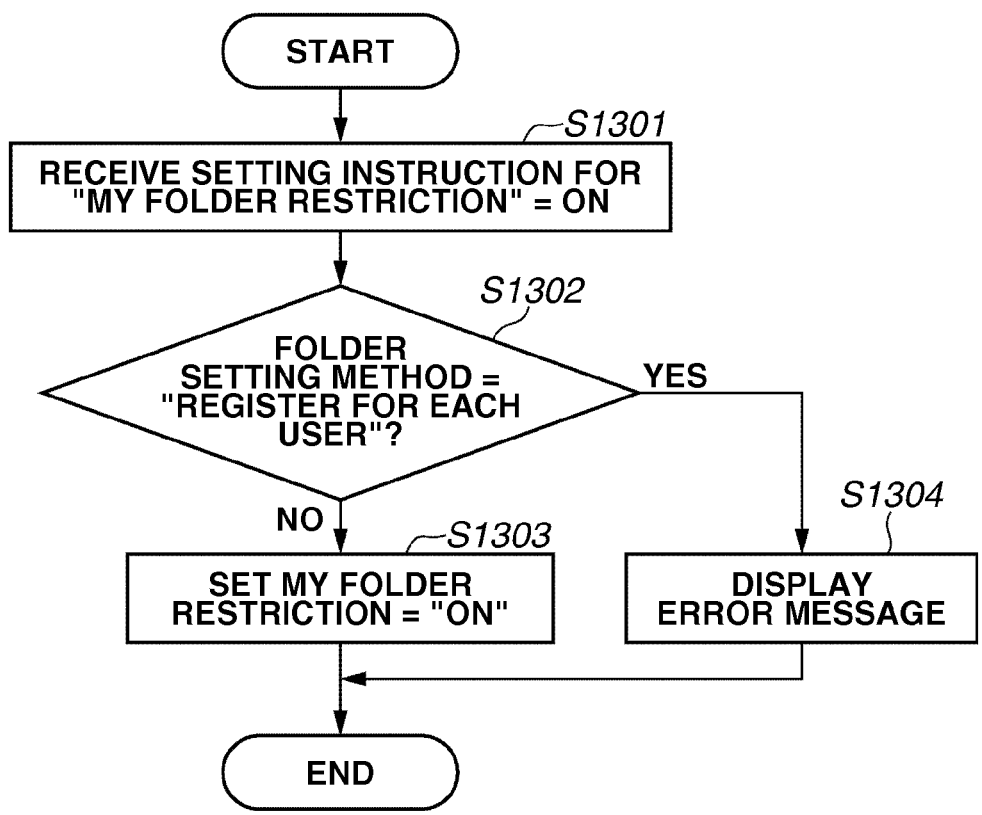
FIG. 13 is a flowchart illustrating an operation performed if a setting of my folder restriction="ON" is instructed in the MFP according to the exemplary embodiment of the present invention.

FIG. 13 is a flowchart illustrating a series of operations to be performed when the operation key 701 in FIG. 7 is operated in the MFP 101. Each operation (step) illustrated in the flowchart in FIG. 13 is realized by the CPU 211 in the MFP 101 by executing a control program stored in the HDD 214.

In step S1301, the CPU 211 receives an instruction to set the my folder restriction to "ON" (an operation of the operation key 701) from the user in a state that the my folder restriction has been set to "OFF".

In step S1302, the CPU 211 determines whether the folder setting method set in advance on the screen in FIG. 6 is "register for each user". If the folder setting method is "register for each user" (YES in step S1302), the processing proceeds to step S1304. If not (NO in step S1302), the processing proceeds to step S1303. In step S1303, the CPU 211 sets the my folder restriction to "ON". Whereas in step S1304, the CPU 211 displays an error message screen illustrated in FIG. 15.

According to the processing illustrated in FIG. 13, the user is prevented from setting the folder setting method to "register for each user" and setting the my folder restriction to "ON" at the same time. As a result, file transmission of image data to an improper destination against the intention of the administrator can be prevented.

In step S1304, the processing for forbidding to set the my folder restriction to "ON" may be performed, or if an instruction is further issued from the administrator while the error message screen has been displayed, the my folder restriction may be set to "ON".

A third exemplary embodiment of the present invention is described. According to the third exemplary embodiment, if the my folder restriction is "ON", the setting of the folder setting method to "register for each user" is restricted. Detailed descriptions of configurations similar to those in the above-described first exemplary embodiment are omitted.

Figure 14:
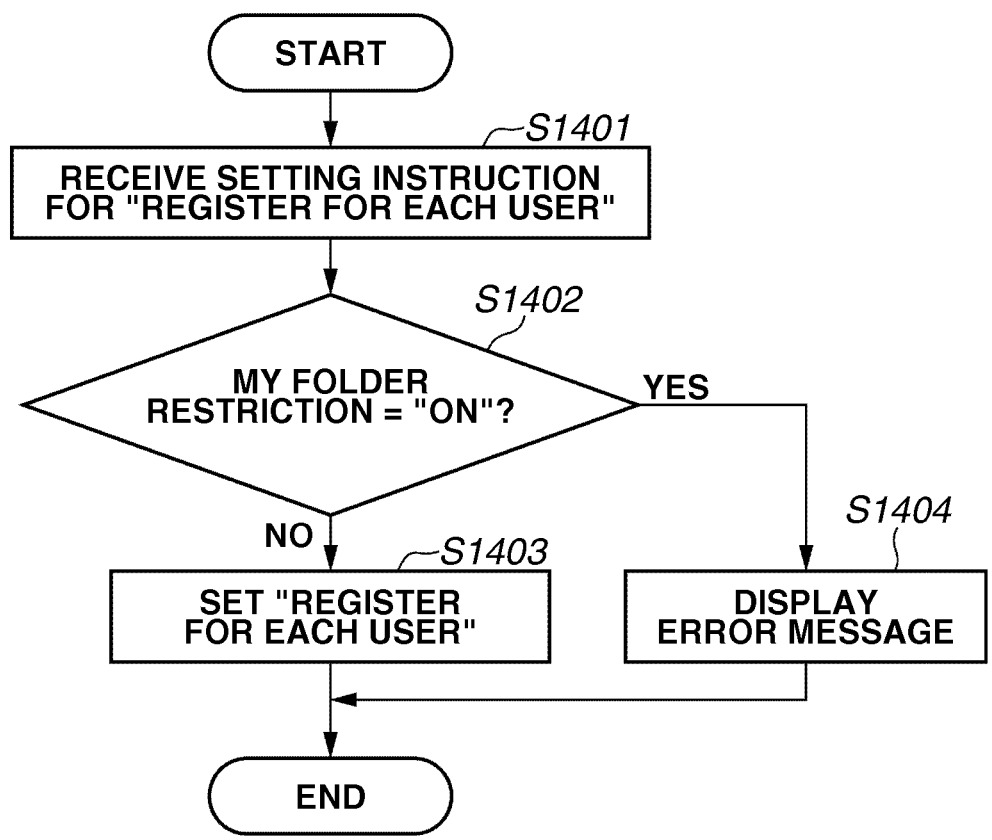
FIG. 14 is a flowchart illustrating an operation performed if a setting of "register for each user" is instructed in the MFP according to the exemplary embodiment of the present invention.

FIG. 14 is a flowchart illustrating a series of operations to be performed when the operation key 602 in FIG. 6 is operated in the MFP 101. Each operation (step) illustrated in the flowchart in FIG. 14 is realized by the CPU 211 in the MFP 101 by executing a control program stored in the HDD 214.

In step S1401, the CPU 211 receives an instruction to set the folder setting method to "register for each user" (an operation of the operation key 602) from the user in a state that the folder setting method has been set to a method other than "register for each user".

In step S1402, the CPU 211 determines whether the my folder restriction set in advance on the screen in FIG. 7 is "ON". If the my folder restriction is "ON" (YES in step S1402), the processing proceeds to step S1404. If the my folder restriction is not "ON" (NO in step S1402), the processing proceeds to step S1403. In step S1403, the CPU 211 sets the folder setting method to "register for each user". Whereas in step S1404, the CPU 211 displays the error message screen illustrated in FIG. 15.

According to the processing illustrated in FIG. 14, the user is prevented from setting the folder setting method to "register for each user" and setting the my folder restriction to "ON" at the same time. As a result, file transmission of image data to an improper destination against the intention of the administrator can be prevented.

In step S1404, the processing for forbidding to set the folder setting method to "register for each user" may be performed, or if an instruction is further issued from the administrator while the error message screen has been displayed, the folder setting method may be set to "register for each user".

A fourth exemplary embodiment of the present invention is described. According to the forth exemplary embodiment, if the folder setting method is "register for each user", a screen is displayed in a state that the my folder restriction cannot be set to "ON". Descriptions of configurations similar to those in the above-described first exemplary embodiment are omitted.

Figure 16:
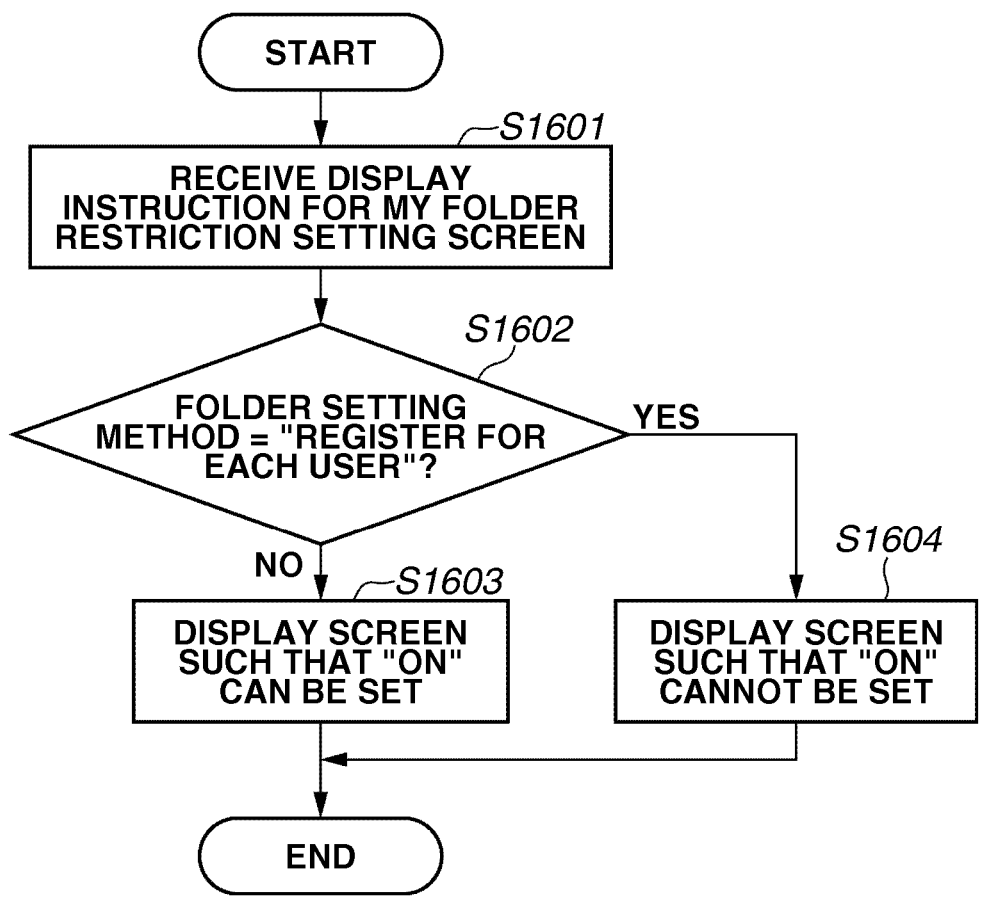
FIG. 16 is a flowchart illustrating an operation performed if an instruction to display a setting screen for the my folder restriction is issued in the MFP according to the exemplary embodiment of the present invention.

FIG. 16 is a flowchart illustrating a series of operations to be performed when an instruction to display the screen in FIG. 7 is issued in the MFP 101. Each operation (step) illustrated in the flowchart in FIG. 16 is realized by the CPU 211 in the MFP 101 by executing a control program stored in the HDD 214.

In step S1601, the CPU 211 receives an instruction to display the screen in FIG. 7 from the user. In step S1602, the CPU 211 determines whether the folder setting method set in advance on the screen in FIG. 6 is "register for each user". If the folder setting method is "register for each user" (YES in step S1602), the processing proceeds to step S1604. If the folder setting method is not "register for each user" (NO in step S1602), the processing proceeds to step S1603.

In step S1603, the CPU 211 displays the screen in FIG. 7 in a state that the user can set the my folder restriction to "ON".

Whereas in step S1604, the CPU 211 displays the screen in FIG. 7 in a state that the user cannot set the my folder restriction to "ON". More specifically, the display of the operation key 701 may be hidden, or the operation key 701 may be grayed out. Alternatively, in this processing, a message indicating that the my folder restriction cannot be set to "ON" because the folder setting method has been set to "register for each user" may be displayed.

According to the processing illustrated in FIG. 16, the user is prevented from setting the folder setting method to "register for each user" and setting the my folder restriction to "ON" at the same time. As a result, file transmission of image data to an improper destination against the intention of the administrator can be prevented.

A fifth exemplary embodiment of the present invention is described. According to the fifth exemplary embodiment, if the my folder restriction has been set to "ON", a screen is displayed in a state that the user cannot set the folder setting method to "register for each user". Descriptions of configurations similar to those in the above-described first exemplary embodiment are omitted.

Figure 17:
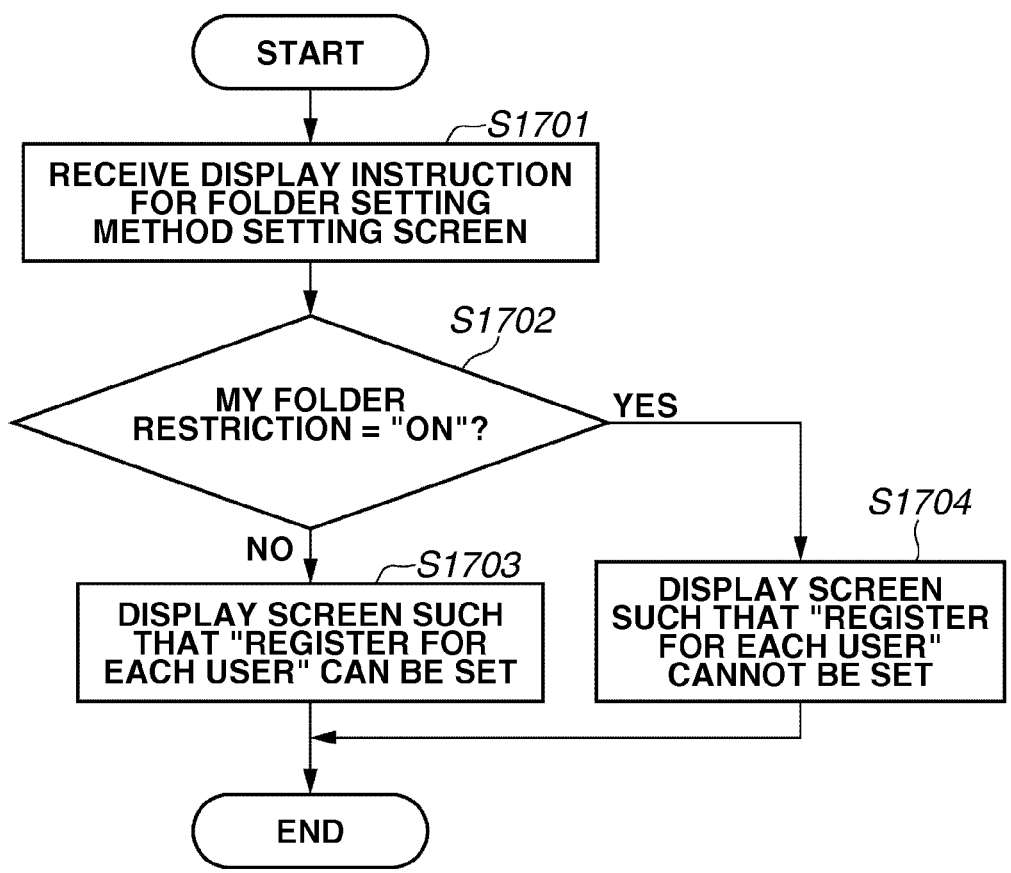
FIG. 17 is a flowchart illustrating an operation performed if an instruction to display a setting screen for setting a folder setting method is issued in the MFP according to the exemplary embodiment of the present invention.

FIG. 17 is a flowchart illustrating a series of operations to be performed when an instruction to display the screen in FIG. 6 is issued in the MFP 101. Each operation (step) illustrated in the flowchart in FIG. 17 is realized by the CPU 211 in the MFP 101 by executing a control program stored in the HDD 214.

In step S1701, the CPU 211 receives an instruction to display the screen in FIG. 6 from the user. In step S1702, the CPU 211 determines whether the my folder restriction set in advance on the screen in FIG. 7 is "ON". If the my folder restriction is "ON" (YES in step S1702), the processing proceeds to step S1704. If the my folder restriction is not "ON" (NO in step S1702), the processing proceeds to step S1703.

In step S1703, the CPU 211 displays the screen in FIG. 6 in a state that the user can set the folder setting method to "register for each user".

Whereas in step S1704, the CPU 211 displays the screen in FIG. 6 in a state that the user cannot set the folder setting method to "register for each user". More specifically, the display of the operation key 602 may be hidden, or the operation key 602 may be grayed out. Alternatively, in this processing, a message indicating that the folder setting method cannot be set to "register for each user" because the my folder restriction has been set to "ON" may be displayed.

According to the processing illustrated in FIG. 17, the user is prevented from setting the folder setting method to "register for each user" and setting the my folder restriction to "ON" at the same time. As a result, file transmission of image data to an improper destination against the intention of the administrator can be prevented.

A sixth exemplary embodiment of the present invention is described. According to the sixth exemplary embodiment, if the my folder restriction is "ON", the folder setting method is "register for each user", and a host name restriction is "OFF", the operation key 514 is not displayed. Detailed descriptions of configurations similar to those in the above-described first exemplary embodiment are omitted.

Figure 18:
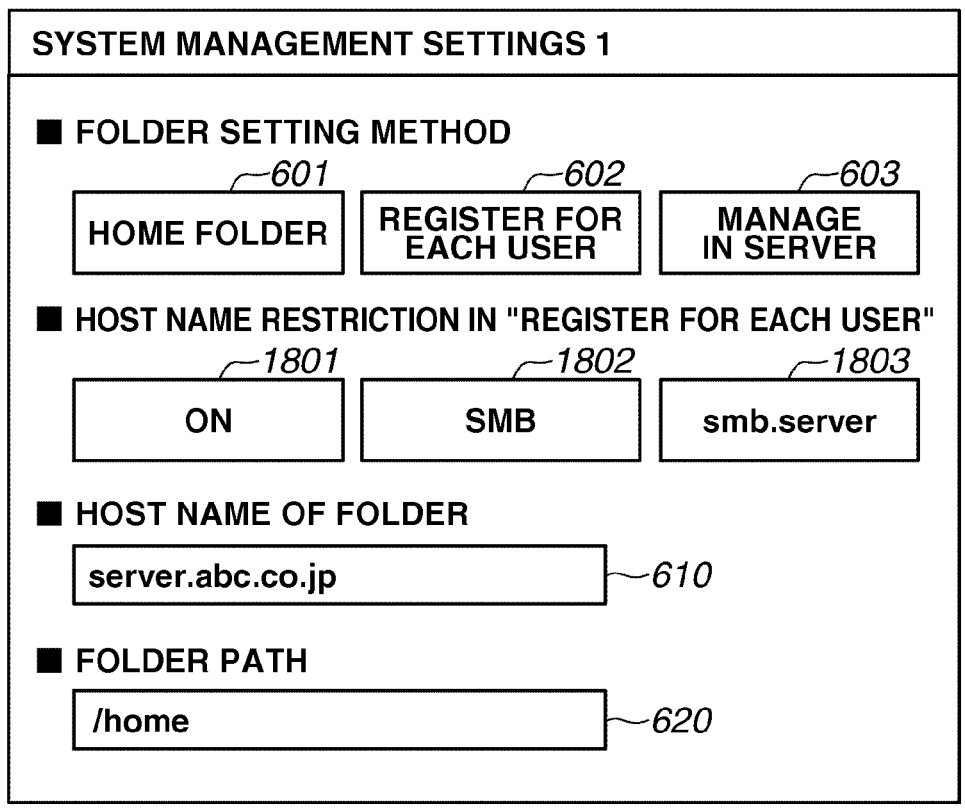
FIG. 18 illustrates an operation screen on the MFP according to the exemplary embodiment of the present invention.

FIG. 18 illustrates an example of an operation screen displayed on the operation unit 219. The screen in FIG. 18 corresponds to the screen in FIG. 6. Similarly to the screen in FIG. 6, this screen can be operated only by the administrator, and when a general user operates the MFP 101, this screen is not displayed. The operation keys 601 to 603 and the information pieces 610 and 620 are similar to those described in the first exemplary embodiment.

In a case where the administrator operates the operation key 602 and selects "register for each user", the administrator can further set the host name restriction to "ON" or "OFF". The host name restriction is a function used in setting the folder information in the "register for each user" mode to restrict the use of the host name of the folder such that host names other than those registered by the administrator cannot be used. If the administrator sets the host name restriction to "ON", the administrator registers a protocol and host name for the file transmission as the information pieces 1802 and 1803.

A screen illustrated in FIG. 19 corresponds to the screen in FIG. 8. Similarly to the screen in FIG. 8, the screen is displayed when a general user operates the MFP 101. The information pieces 801 to 805 are similar to those described in the first exemplary embodiment. In the case that the host name restriction is "ON", the screen is displayed in a state that the contents of the information pieces 1802 and 1803 are set in advance, and the user is not allowed to change the contents, as illustrated in FIG. 19. Accordingly, even if the folder setting method is set to "register for each user", the destination for the file transmission can be limited to a specific host. As a result, the security level can be increased.

Figure 20:
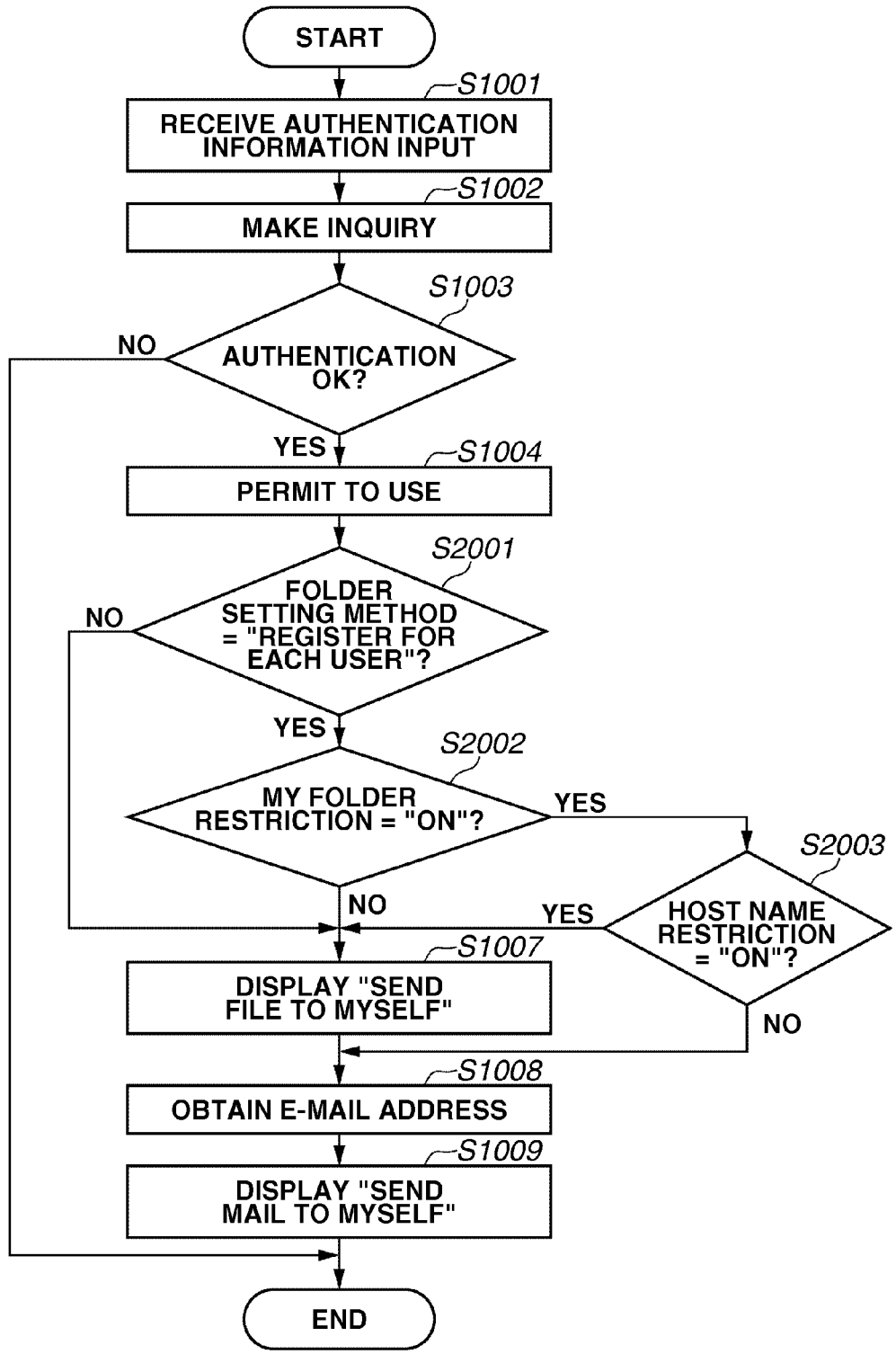
FIG. 20 is a flowchart illustrating a login operation in the MFP according to the exemplary embodiment of the present invention.

FIG. 20 is a flowchart illustrating a login operation performed in the MFP 101 (a series of operations performed when the user starts to use the MFP 101). The flowchart in FIG. 20 corresponds to that in FIG. 10. Each operation (step) illustrated in the flowchart in FIG. 20 is realized by the CPU 211 in the MFP 101 by executing a control program stored in the HDD 214. Processing in steps S1001 to S1004 and steps S1007 to S1009 are similar to those described in the first exemplary embodiment.

In step S2001, the CPU 211 determines whether the folder setting method set in advance on the screen in FIG. 18 is "register for each user". If the folder setting method is "register for each user" (YES in step S2001), the processing proceeds to step S2002. If the folder setting method is not "register for each user" (NO in step S2001), the processing proceeds to step S1007. In step S1007, the CPU 211 displays the operation key 514 on the screen in FIG. 5.

In step S2002, the CPU 211 determines whether the my folder restriction set in advance on the screen in FIG. 7 is "ON". If the my folder restriction is "ON" (YES in step S2002), the processing proceeds to step S2003. If the my folder restriction is not "ON" (NO in step S2002), the processing proceeds to step S1007.

In step S2003, the CPU 211 determines whether the host name restriction set in advance on the screen in FIG. 18 is "ON". If the host name restriction is "ON" (YES in step S2003), the processing proceeds to step S1007. If the host name restriction is not "ON" (NO in step S2003), the processing proceeds to step S1008.

In other words, even if the folder setting method is set to "register for each user" and the my folder restriction is set to "ON", in a case where the host name restriction is set to "ON" (not "OFF"), then in step S1007, the operation key 514 is displayed. Thus, according to the processing illustrated in FIG. 20, the possibility of the file transmission of the image data to an improper destination against the intention of the administrator can be reduced by the host name restriction. Consequently, the security can be ensured and convenience of users can also be achieved.

A seventh exemplary embodiment of the present invention is described. According to the seventh exemplary embodiment, if the folder setting method is "register for each user", and the host name restriction is "OFF", the setting of the my folder restriction to "ON" is restricted. Detailed descriptions of configurations similar to those in the above-described first exemplary embodiment are omitted.

Figure 21:
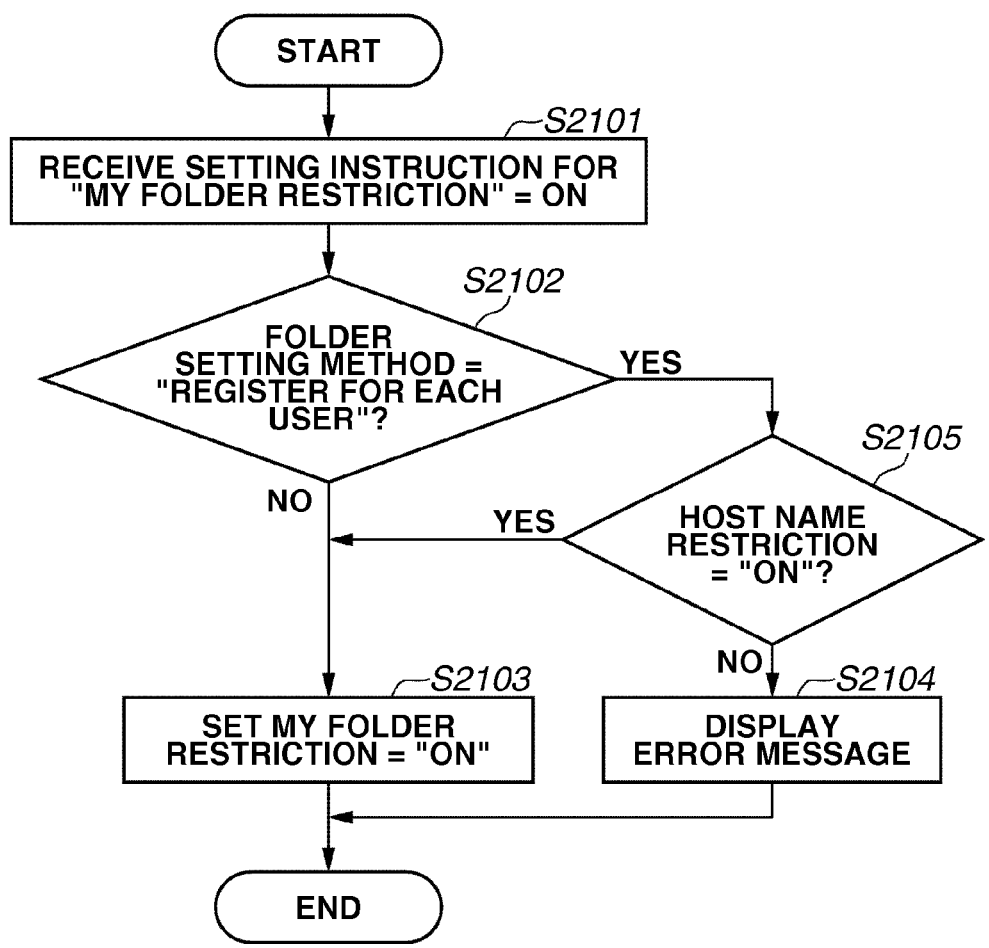
FIG. 21 is a flowchart illustrating an operation performed if a setting of my folder restriction="ON" is selected in the MFP according to the exemplary embodiment of the present invention.

FIG. 21 is a flowchart illustrating a series of operations to be performed when the operation key 701 in FIG. 7 is operated in the MFP 101. Each operation (step) illustrated in the flowchart in FIG. 21 is realized by the CPU 211 in the MFP 101 by executing a control program stored in the HDD 214.

In step S2101, the CPU 211 receives an instruction to set the my folder restriction to "ON" (an operation of the operation key 701) from the user in a state that the my folder restriction has been set to "OFF".

In step S2102, the CPU 211 determines whether the folder setting method set in advance on the screen in FIG. 18 is "register for each user". If the folder setting method is "register for each user" (YES in step S2102), the processing proceeds to step S2105. If the folder setting method is not "register for each user" (NO in step S2102), the processing proceeds to step S2103. In step S2103, the CPU 211 sets the my folder restriction to "ON".

In step S2105, the CPU 211 determines whether the host name restriction set in advance on the screen in FIG. 18 is "ON". If the host name restriction is ON (YES in step S2105), the processing proceeds to step S2103. If the host name restriction is not "ON" (NO in step S2105), the processing proceeds to step S2104. In step S2104, the CPU 211 displays an error message screen illustrated in FIG. 23.

As described above, according to the seventh exemplary embodiment, even if the folder setting method is "register for each user", in the case where the host name restriction is "ON", the user is allowed to set the my folder restriction to "ON". Thus, according to the processing illustrated in FIG. 21, the possibility of the file transmission of the image data to an improper destination against the intention of the administrator can be reduced by the host name restriction. Consequently, the security can be ensured and convenience of users can also be achieved.

In step S2104, the processing for forbidding to set the my folder restriction to "ON" may be performed, or if an instruction is further issued from the administrator while the error message screen has been displayed, the my folder restriction may be set to "ON".

An eighth exemplary embodiment of the present invention is described. According to the eighth exemplary embodiment, if the my folder restriction is "ON", the setting of the host name restriction to "OFF" is restricted. Detailed descriptions of configurations similar to those in the above-described first exemplary embodiment are omitted.

Figure 22:
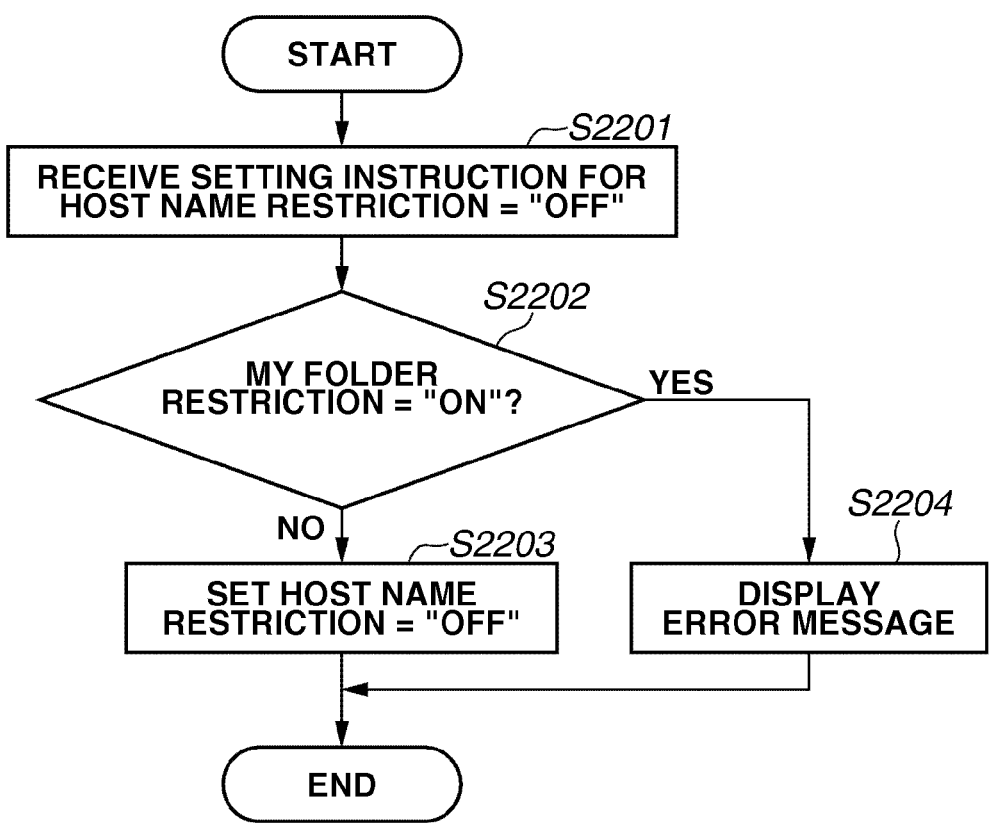
FIG. 22 is a flowchart illustrating an operation performed if a setting of host name restriction="OFF" is selected in the MFP according to the exemplary embodiment of the present invention.

FIG. 22 is a flowchart illustrating a series of operations to be performed when an instruction to set the information 1801 in FIG. 18 to "OFF" is issued in the MFP 101. Each operation (step) illustrated in the flowchart in FIG. 22 is realized by the CPU 211 in the MFP 101 by executing a control program stored in the HDD 214.

In step S2201, in a state that the host name restriction has been set to "ON", the CPU 211 receives an instruction to set the host name restriction to "OFF" from the user.

In step S2202, the CPU 211 determines whether the my folder restriction set in advance on the screen in FIG. 7 is "ON". If the my folder restriction is "ON" (YES in step S2202), the processing proceeds to step S2204. If the my folder restriction is not "ON" (NO in step S2202), the processing proceeds to step S2203.

In step S2203, the CPU 211 sets the host name restriction to "OFF". Whereas in step S2204, the CPU 211 displays the error message screen illustrated in FIG. 23.

According to the processing illustrated in FIG. 22, the user is prevented from setting the host name restriction to "OFF" and setting the my folder restriction to "ON" at the same time. As a result, file transmission of image data to an improper destination against the intention of the administrator can be prevented.

In step S2204, the processing for forbidding to set the host name restriction to "OFF" may be performed, or if an instruction is further issued from the administrator while the error message screen has been displayed, the host name restriction may be set to "OFF".

A ninth exemplary embodiment of the present invention is described. According to the ninth exemplary embodiment, if the folder setting method is "register for each user" and the host name restriction is "OFF", a screen is displayed in a state that the user cannot set the my folder restriction to "ON". Detailed descriptions of configurations similar to those in the above-described first exemplary embodiment are omitted.

Figure 24:
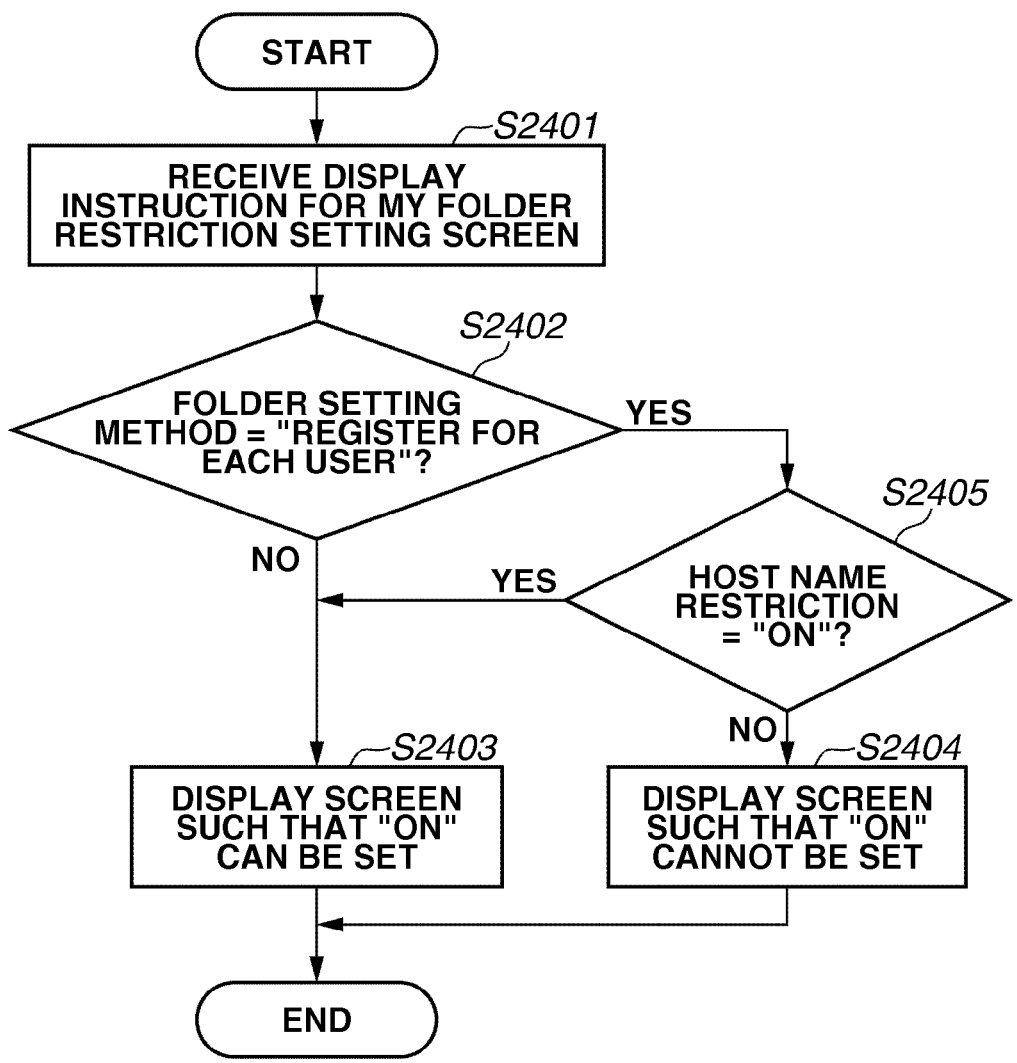
FIG. 24 is a flowchart illustrating an operation performed if an instruction to display a setting screen for the my folder restriction is issued in the MFP according to the exemplary embodiment of the present invention.

FIG. 24 is a flowchart illustrating a series of operations to be performed when an instruction to display the screen in FIG. 7 is issued in the MFP 101. Each operation (step) illustrated in the flowchart in FIG. 24 is realized by the CPU 211 in the MFP 101 by executing a control program stored in the HDD 214.

In step S2401, the CPU 211 receives an instruction to display the screen in FIG. 7 from the user. In step S2402, the CPU 211 determines whether the folder setting method set in advance on the screen in FIG. 18 is "register for each user". If the folder setting method is "register for each user" (YES in step S2402), the processing proceeds to step S2405. If the folder setting method is not "register for each user" (NO in step S2402), the processing proceeds to step S2403.

In step S2403, the CPU 211 displays the screen in FIG. 7 in a state that the user can set the my folder restriction to "ON".

In step S2405, the CPU 211 determines whether the host name restriction set in advance on the screen in FIG. 18 is "ON". If the host name restriction is "ON" (YES in step S2405), the processing proceeds to step S2403. If the host name restriction is not "ON" (NO in step S2405), the processing proceeds to step S2404.

In step S2404, the CPU 211 displays the screen in FIG. 7 in a state that the user cannot set the my folder restriction to "ON". More specifically, the display of the operation key 701 may be hidden, or the operation key 701 may be grayed out. Alternatively, in this processing, a message indicating that the my folder restriction cannot be set to "ON" because the folder setting method has been set to "register for each user" and the host name restriction has not set to "ON" can be displayed.

As described above, according to the ninth exemplary embodiment, even if the folder setting method is "register for each user", in the case where the host name restriction is "ON", the user is allowed to set the my folder restriction to "ON". Thus, according to the processing illustrated in FIG. 24, the possibility of the file transmission of the image data to an improper destination against the intention of the administrator can be reduced by the host name restriction. Consequently, the security can be ensured and convenience of users can also be achieved.

A tenth exemplary embodiment of the present invention is described. According to the tenth exemplary embodiment, in a case where the my folder restriction has been set to "ON", a screen is displayed in a state that the user cannot set the host name restriction to "OFF". Detailed descriptions of configurations similar to those in the above-described first exemplary embodiment are omitted.

FIG. 25 is a flowchart illustrating a series of operations to be performed when an instruction to display the screen in FIG. 18 is issued in the MFP 101. Each operation (step) illustrated in the flowchart in FIG. 25 is realized by the CPU 211 in the MFP 101 by executing a control program stored in the HDD 214.

In step S2501, the CPU 211 receives an instruction to display the screen in FIG. 18 from the user. In step S2502, the CPU 211 determines whether the my folder restriction set in advance on the screen in FIG. 7 is "ON". If the my folder restriction is "ON" (YES in step S2502), the processing proceeds to step S2504. If the my folder restriction is not "ON" (NO in step S2502), the processing proceeds to step S2503.

In step S2503, the CPU 211 displays the screen in FIG. 18 in a state that the user can set the host name restriction to "OFF".

Whereas in step S2504, the CPU 211 displays the screen in FIG. 18 in a state that the user cannot set the host name restriction to "OFF". More specifically, the display of the entry field for the information 1801 may be hidden, or the entry field for the information 1801 may be grayed out. Alternatively, in this processing, a message indicating that the host name restriction cannot be set to "OFF" because the my folder restriction has been set to "ON" may be displayed.

According to the processing illustrated in FIG. 25, the user is prevented from setting the host name restriction to "OFF" and setting the my folder restriction to "ON" at the same time. As a result, file transmission of image data to an improper destination against the intention of the administrator can be prevented.

According to the above-described exemplary embodiments, On and OFF of the my folder restriction is switched via the operation screen in FIG. 7. Alternatively, other mechanisms can be employed. For example, the use of the operation keys 511 to 513 can be restricted using a mechanism for managing the authority of each user, and accordingly the my folder restriction can be realized.

As described above, the MFP 101 receives an input of authentication information from a user (step S1001). The authentication server authenticates the user based on the authentication information received by the MFP 101 (step S1002). The MFP 101 sets a destination of image data (FIG. 5). The MFP 101 is provided with an operation key for setting a folder of the user as the destination of the image data (operation key 514).

The MFP 101 sends the image data to the set destination (step S1205). In a case where the destination to be set is limited to the destination set with the operation key 514 (my folder restriction="ON") and the folder to be set in response to the operation of the operation key 514 is registered by the user (folder setting method="register for each user"), the MFP 101 prevents the setting of the destination with the operation key 514 (YES in step S1006).

Further, in a case where the destination to be set is limited to the destination set with the operation key 514 (my folder restriction="ON"), the MFP 101 restricts the setting of the folder to be set in response to the operation of the operation key 514 to the one to be registered by the user (folder setting method="register for each user") (steps S1404 and S1704).

Further, in a case where the folder to be set in response to the operation of the operation key 514 is the one to be registered by the user (folder setting method="register for each user"), the MFP 101 restricts the setting of the destination to be set to be limited to the destination set with the operation key 514 (my folder restriction="ON") (steps S1304 and S1604).

Accordingly, in the image processing system including the operation key for setting a folder of a user, transmission of image data to an improper destination can be prevented.

Embodiments of the present invention can also be realized by a computer of a system or an apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-050692 filed Mar. 7, 2012, which is hereby incorporated by reference herein in its entirety.

What is claimed is:

1. An image processing system comprising:
a reception unit configured to receive authentication information;
an authentication unit configured to authenticate a user based on the authentication information received by the reception unit;
an operation key configured to set a transmission destination of image data to a registered folder;
a transmission unit configured to transmit the image data to the transmission destination set by the operation key; and
a control unit configured to, in a case where the transmission destination set by the operation key is a folder registered by the user authenticated by the authentication unit and a transmission destination is limited to a transmission destination registered by an administrator, perform control to restrict setting of a transmission destination by the operation key,
wherein the reception unit, the authentication unit, the transmission unit, and the control unit are implemented, at least in part, by a processor and a memory.

2. The image processing system according to claim 1, further comprising:
a display unit configured to display the operation key,
wherein the control unit does not display the operation key on the display unit so as to restrict setting of the transmission destination by the operation key.

3. The image processing system according to claim 1, wherein in a case where the transmission destination is a folder set by combining the authentication information received by the reception unit and information registered by the administrator and the transmission destination is limited to a transmission destination registered by the administrator, the control unit allows setting of the transmission destination by the operation key.

4. The image processing system according to claim 1, wherein in a case where the transmission destination is a folder notified from an authentication apparatus and the transmission destination is limited to a transmission destination registered by the administrator, the control unit allows setting of the transmission destination by the operation key.

5. The image processing system according to claim 4, wherein the authentication apparatus authenticates the user based on the authentication information received by the reception unit, and wherein the user is permitted to use an image processing apparatus included in the image processing system according to a result of the authentication by the authentication apparatus.

6. The image processing system according to claim 1, wherein the transmission destination registered by the administrator is a folder which is commonly used by a plurality of users.

7. An image processing system comprising:
a reception unit configured to receive authentication information;
an authentication unit configured to authenticate a user based on the authentication information received by the reception unit;
an operation key configured to set a transmission destination of image data to a registered folder;
a transmission unit configured to transmit the image data to the transmission destination set by the operation key; and
a control unit configured to, in a case where the transmission destination is limited to a transmission destination registered by an administrator, restrict a transmission destination set by the operation key from being set to a folder registered by the user authenticated by the authentication unit,
wherein the reception unit, the authentication unit, the transmission unit, and the control unit are implemented, at least in part, by a processor and a memory.

8. The image processing system according to claim 7, further comprising a display unit configured to display an error message in a case where the transmission destination is limited to a transmission destination registered by the administrator and an instruction to set a transmission destination set by the operation key to the folder registered by the user is issued.

9. The image processing system according to claim 7, wherein the transmission destination registered by the administrator is a folder which is commonly used by a plurality of users.

10. An image processing system comprising:
a reception unit configured to receive authentication information;
an authentication unit configured to authenticate a user based on the authentication information received by the reception unit;
an operation key configured to set a transmission destination of image data to a registered folder;
a transmission unit configured to transmit the image data to the transmission destination set by the operation key; and
a control unit configured to, in a case where a transmission destination set by the operation key is a folder registered by the user authenticated by the authentication unit, restrict a transmission destination from being limited to a transmission destination registered by an administrator,
wherein the reception unit, the authentication unit, the transmission unit, and the control unit are implemented, at least in part, by a processor and a memory.

11. The image processing system according to claim 10, further comprising a display unit configured to display an error message in a case where the transmission destination set by the operation key is a folder registered by the user authenticated by the authentication unit and an instruction to limit the transmission destination to a transmission destination registered by the administrator is issued.

12. The image processing system according to claim 10, wherein the transmission destination registered by the administrator is a folder which is commonly used by a plurality of users.

13. An image processing apparatus comprising:
a reception unit configured to receive authentication information;
a requesting unit configured to request an authentication apparatus to authenticate a user based on the authentication information received by the reception unit;
an operation key configured to set a transmission destination of image data to a registered folder;
a transmission unit configured to transmit the image data to the transmission destination set by the operation key; and
a control unit configured to, in a case where the transmission destination set by the operation key is a folder registered by the user authenticated by the authentication apparatus and a transmission destination is limited to a transmission destination registered by an administrator, perform control to restrict setting of a transmission destination by the operation key,
wherein the reception unit, the requesting unit, the transmission unit, and the control unit are implemented, at least in part, by a processor and a memory.

14. An image processing apparatus comprising:
a reception unit configured to receive authentication information;
a requesting unit configured to request an authentication apparatus to authenticate a user based on the authentication information received by the reception unit;
an operation key configured to set a transmission destination of image data to a registered folder;
a transmission unit configured to transmit the image data to the transmission destination set by the operation key; and
a control unit configured to, in a case where the transmission destination is limited to a transmission destination registered by an administrator, restrict a transmission destination set by the operation key from being set to a folder registered by the user authenticated by the authentication apparatus,
wherein the reception unit, the requesting unit, the transmission unit, and the control unit are implemented, at least in part, by a processor and a memory.

15. An image processing apparatus comprising:
a reception unit configured to receive authentication information;
a requesting unit configured to request an authentication apparatus to authenticate a user based on the authentication information received by the reception unit;
an operation key configured to set a transmission destination of image data to a registered folder;
a transmission unit configured to transmit the image data to the transmission destination set by the operation key; and
a control unit configured to, in a case where a transmission destination set by the operation key is a folder registered by the user authenticated by the authentication apparatus, restrict a transmission destination from being limited to a transmission destination registered by an administrator,
wherein the reception unit, the requesting unit, the transmission unit, and the control unit are implemented, at least in part, by a processor and a memory.

16. A method for controlling an image processing apparatus, the method comprising:
receiving authentication information;
requesting an authentication apparatus to authenticate a user based on the received authentication information; and
in a case where a transmission destination set by an operation key is a folder registered by the authenticated user and a transmission destination is limited to a transmission destination registered by an administrator, performing control to restrict setting of a transmission destination by the operation key.

17. A storage medium storing a program for instructing a computer to execute a method according to claim 16.

18. A method for controlling an image processing apparatus, the method comprising:
receiving authentication information;
requesting an authentication apparatus to authenticate a user based on the received authentication information; and
in a case where a transmission destination is limited to a transmission destination registered by an administrator, restricting a transmission destination set by an operation key for setting a transmission destination of image data from being set to a folder registered by the authenticated user.

19. A storage medium storing a program for instructing a computer to execute a method according to claim 18.

20. A method for controlling an image processing apparatus, the method comprising:
receiving authentication information;
requesting an authentication apparatus to authenticate a user based on the received authentication information; and
in a case where a transmission destination by an operation key for setting a transmission destination of image data is a folder registered by the authenticated user, restricting a transmission destination from being limited to a transmission destination registered by an administrator.

21. A storage medium storing a program for instructing a computer to execute a method according to claim 20.

* * * * *